(12) United States Patent
Hoff

(10) Patent No.: US 12,145,776 B2
(45) Date of Patent: Nov. 19, 2024

(54) PLATE-SHAPED STRUCTURE, A RESERVOIR AND METHOD

(71) Applicant: Debora de Fatima Auria Aranda, Roosendaal (NL)

(72) Inventor: Petrus Mattheus Maria Hoff, Steenbergen (NL)

(73) Assignee: Debora De Fatima Auria Aranda, Roosendaal (NL)

( * ) Notice: Subject to any disclaimer, the term of this patent is extended or adjusted under 35 U.S.C. 154(b) by 0 days.

(21) Appl. No.: 16/276,809

(22) Filed: Feb. 15, 2019

(65) Prior Publication Data

US 2019/0177046 A1 Jun. 13, 2019

Related U.S. Application Data

(63) Continuation-in-part of application No. 16/318,743, filed as application No. PCT/NL2017/050493 on Jul. 20, 2017, now abandoned.

(30) Foreign Application Priority Data

Jul. 22, 2016 (NL) ...................................... 2017220
Dec. 23, 2016 (NL) ...................................... 2018076

(51) Int. Cl.
*B65D 43/10* (2006.01)
*A01G 13/02* (2006.01)
(Continued)

(52) U.S. Cl.
CPC ..... *B65D 43/0212* (2013.01); *A01G 13/0243* (2013.01); *A01G 27/006* (2013.01);
(Continued)

(58) Field of Classification Search
CPC ...... B65D 43/0212; B65D 2543/00777; B65D 2543/00805; B65D 50/045; B65D 50/046;
(Continued)

(56) References Cited

U.S. PATENT DOCUMENTS 3,335,774 A * 8/1967 Reed .................. B65D 43/0208
220/790
3,464,582 A * 9/1969 Greitzer ............. B65D 43/0212
220/786

(Continued)

FOREIGN PATENT DOCUMENTS

CN 101300940 A 11/2008
CN 204862305 U 12/2015
(Continued)

OTHER PUBLICATIONS

International Search Report issued on Dec. 8, 2017 for application No. PCT/NL2017/050493.
NL Search issued on Jun. 15, 2018 for application No. NL2018076.

*Primary Examiner* — Allan D Stevens
(74) *Attorney, Agent, or Firm* — David P. Owen; Hoyng Rokh Monegier B.V.

(57) ABSTRACT

A plate-shaped structure designed for covering a reservoir, the plate-shaped structure having a generally flat surface and a flange at the periphery of the generally flat upper surface. The flange has a plurality of openings designed to receive a protrusion on an exterior sidewall of the reservoir, thereby covering the reservoir.

10 Claims, 21 Drawing Sheets

(51) Int. Cl.
   *A01G 27/00*  (2006.01)
   *A01G 27/02*  (2006.01)
   *A01G 29/00*  (2006.01)
   *B65D 43/02*  (2006.01)

(52) U.S. Cl.
   CPC ............. *A01G 27/02* (2013.01); *A01G 29/00* (2013.01); *B65D 2251/065* (2013.01); *B65D 2543/00777* (2013.01); *B65D 2543/00805* (2013.01)

(58) Field of Classification Search
   CPC ........ B65D 50/066; B65D 2543/00462; B65D 43/0208; B65D 43/065
   See application file for complete search history.

(56) References Cited

U.S. PATENT DOCUMENTS

| | | | |
|---|---|---|---|
| 3,618,260 | A | 11/1971 | Convey, Jr. |
| 3,716,164 | A * | 2/1973 | Fennema ............ B65D 43/0212 220/786 |
| 3,795,360 | A * | 3/1974 | Bianchi .............. B65D 43/0212 D7/392.1 |
| 3,938,695 | A * | 2/1976 | Ruff .................. B65D 43/0208 220/DIG. 30 |
| 5,509,232 | A | 4/1996 | Laubsch |
| 6,976,334 | B1 | 12/2005 | Bowditch |
| D754,538 | S * | 4/2016 | Roesler ........................... D9/443 |
| 2005/0224498 | A1 * | 10/2005 | Savicki .............. B65D 43/0231 220/366.1 |
| 2009/0152134 | A1 * | 6/2009 | Katsis ..................... B65D 5/38 206/96 |
| 2010/0212222 | A1 | 8/2010 | Gallo |
| 2010/0243722 | A1 * | 9/2010 | Hyder ................ A47G 19/2272 493/171 |
| 2011/0120000 | A1 | 5/2011 | Ogilvie |
| 2014/0215909 | A1 | 8/2014 | Hoff |
| 2014/0252032 | A1 * | 9/2014 | Corbett .................. B65D 11/06 222/105 |
| 2015/0076149 | A1 * | 3/2015 | Roesler ................ B65D 43/022 220/212 |
| 2015/0210442 | A1 * | 7/2015 | Frankel .............. B65D 43/0212 220/315 |
| 2015/0307240 | A1 * | 10/2015 | Hung .................. B65D 43/0208 220/200 |
| 2016/0029824 | A1 * | 2/2016 | Yiu ........................ B65D 43/14 220/254.1 |
| 2016/0347512 | A1 * | 12/2016 | Horner .................. B65D 41/04 |
| 2017/0202195 | A1 * | 7/2017 | Volker .................. B65D 51/18 |
| 2018/0007846 | A1 | 1/2018 | Aranda |
| 2018/0290798 | A1 * | 10/2018 | Peng .................. B65D 51/245 |

FOREIGN PATENT DOCUMENTS

| | | | | |
|---|---|---|---|---|
| FR | 2912115 A1 * | 8/2008 | ......... B65D 43/0212 |
| GB | 2594721 A * | 11/2021 | ............ B65D 41/34 |
| KR | 1020140051628 A | 5/2014 | |
| MX | 2013006808 A | 10/2013 | |
| MX | 2017009503 A | 2/2018 | |
| NL | 2012651 B1 | 7/2016 | |
| WO | WO-2007065240 A1 * | 6/2007 | ......... B65D 43/0204 |
| WO | 2009078721 A | 6/2009 | |
| WO | WO2011031153 | 3/2011 | |
| WO | WO2012081980 | 6/2012 | |
| WO | WO-2014116105 A1 * | 7/2014 | ......... B65D 43/0212 |
| WO | WO2016118011 | 7/2016 | |

* cited by examiner

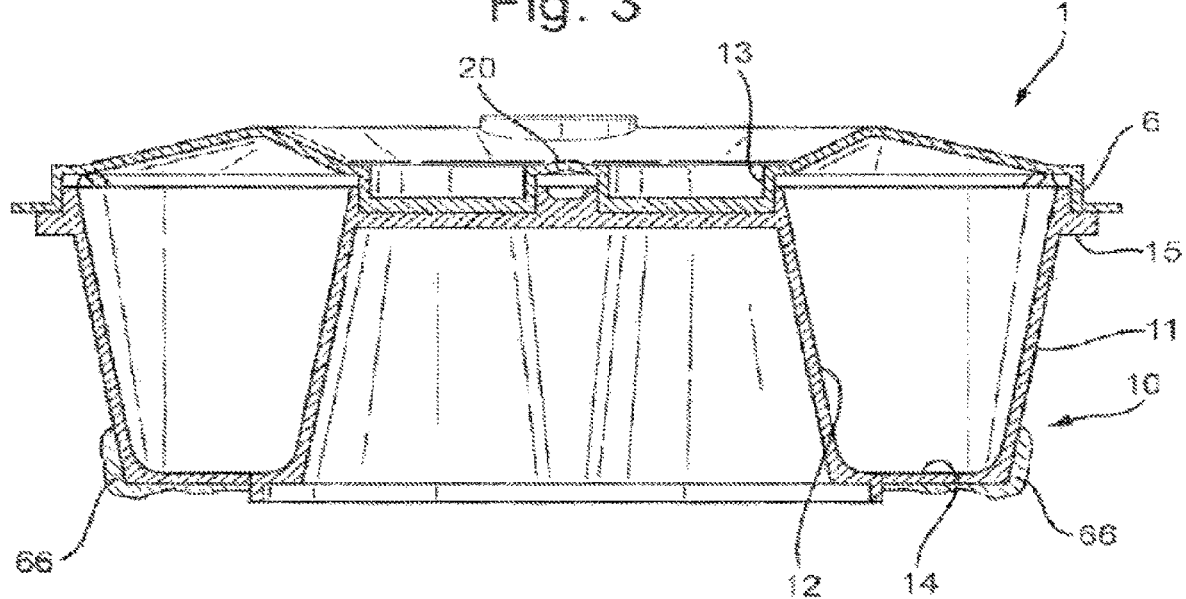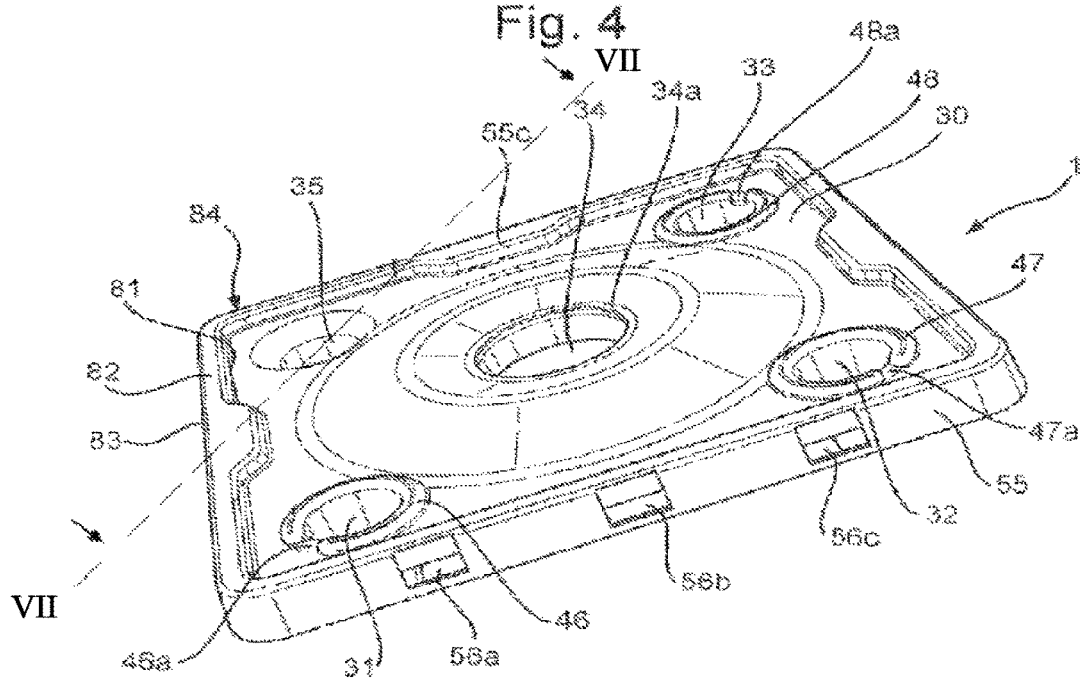

PLATE-SHAPED STRUCTURE, A RESERVOIR AND METHOD

CROSS-REFERENCE TO RELATED APPLICATIONS

This is a continuation-in-part of prior application Ser. No. 16/318,743 filed Jan. 18, 2019, which is a national stage application of international application PCT/NL2017/050493 filed on Jul. 20, 2017, which claims priority from Netherlands application NL 2017220 filed on Jul. 22, 2016, which are all hereby incorporated by reference in their entirety.

BACKGROUND OF THE INVENTION

Field of the Invention

The invention relates to a plate-shaped structure for cultivating one or more plants, comprising a generally flat upper surface, especially for connecting to a reservoir.

Description of Related Art Including Information Disclosed Under 37 CFR 1.97 and 1.98

Such a plate-shaped structure is e.g. known from WO 2012/081980. Both the plate-shaped structure and the reservoir can be made from paper material rendering the plant irrigation system very cheap. The known plate-shaped structure is provided with a central opening for surrounding a plant to be protected.

Although the plate-shaped structure and the reservoir provide satisfying results in practice, there is an ongoing need to increase its functionality.

BRIEF SUMMARY OF THE INVENTION

It is an object of the invention to provide a plate-shaped structure according to the preamble wherein the functionality increases.

Thereto, the generally flat upper surface is provided with a single or a multiple number of cavities for receiving plant material:
a drain opening provided with a sidewall extending downwardly in a tapered manner for entering moisture that is received on the generally flat upper surface downwardly
a cap located freely in the drain opening, so as to allow water to seep down between the cap and the sidewall of the drain opening, the cap having a weight greater than the weight of a body of water with the same volume of the cap, the cap having an outer contour that is in conformity with a cross sectional geometry of the downwardly tapered sidewall of the drain opening.

The cavity may have a sidewall and a bottom portion, wherein the bottom portion includes an aperture or slits traversing the plate-shaped structure. Then, not only a single plant or two plants surrounded by a central opening of a known plate-shaped structure can be cultivated, but also further plant material may be cultivated. e.g. seed material.

By providing one or more drain opening, each with a cap, evaporation of precious moisture is counteracted while still offering a capacity of harvesting rainwater during a heavy rain shower. A cap provided freely in the drain opening (i.e. lying circumferentially surrounded by the sidewall of the drain opening without being mechanically fixed to it) is used to enable water to seep down to a reservoir below the plate-shaped structure, while limiting the area from which water loss due to upward evaporation from the reservoir. i.e. to provide a siphon function.

Preferably, a water seep rate of at least 0.2 and more preferably 0.5 or one liter water per minute is provided for the plate-shaped structure. It has been found that roughness of the surface of the cap and/or the side wall where they are in contact with each other makes it possible to realize such a rate of seepage. The roughness provides for channels for water seepage, as can be seen by observing the seepage. Side walls made of paper have been found to realize a sufficient rate of seepage. If desired, the seepage rate may be increased by roughening the surface of the cap and/or sidewall, or by providing dedicated channels in the surface of the cap and/or sidewall.

In an embodiment the plate-shaped structure may be entirely formed by paper material.

By providing a cap that is heavier than water freely in a drain opening so that water seeps between the cap and the sidewall of the drain opening, it is counteracted that the generally flat upper surface remains humid and collapses.

Use of a cap that is heavier than water reduces the risk that the cap can be blown off. It has been found that this provides for a closing function that is compatible with use of paper structures, wherein e.g. screw or clamp closures are difficult to realize.

As an example, the cap may be implemented as a clay ball. When a cap is used that does not float in water, there is a risk that the cap will rotate to an arbitrary orientation, which could compromise the closing function of the cap to reduce evaporation. Use of a ball shaped cap has the advantage that the rotation of the cap will not affect the closing function of the cap. When caps of other shapes are used, it may be preferable to use a shape of which the center of mass is below the edge of the cap that is in contact with the side wall of the drain opening.

Use of a cap that is heavier than water in contact with a paper sidewall can be applied more generally e.g. to sidewalls of drinking cups to reduce evaporation.

By providing the above-described drain opening cooperating with the cap such as a ball-shaped cap, the overall structure of the plate-shaped structure remains intact, also during wet atmospheric conditions, thus counteracting evaporation of pre-collected moisture.

The plate-shaped structure can thus be provided such that weight and/or damage of water, sand and/or soil can be resisted.

According to yet a further aspect, the plate-shaped structure further comprises a stay defining a predefined offset between opposite sections of the central opening. By providing a stay defining a predefined offset between opposite sections of the interior side wall top edge of the reservoir, any deformation of the interior side wall inwardly into the area surrounded by said interior side wall is counteracted, thereby maintaining the shape and orientation of the interior side wall so that the connection is also maintained and the occurrence of any undesired opening in the connection is counteracted. Then, evaporation of precious moisture from the reservoir is counteracted.

In an embodiment the structure covers a reservoir for storing moisture for moistening the plant, the reservoir comprising an upwardly extending exterior sidewall the generally flat upper surface including a downwardly oriented flange at the periphery of the generally flat upper surface, for receiving the upwardly extending exterior sidewall of the reservoir, the downwardly oriented flange and the upwardly extending exterior sidewall comprising corresponding protrusions and openings for receiving the protrusions. The protrusions may be on the flange and the openings on the reservoir, or vice versa, or the different protrusions may be provided on the flange and the reservoir respectively and corresponding openings vice versa on the reservoir and the flange. When the protrusions extend to the openings they secure the generally flat upper surface to the reservoir. The openings may contain detents for detaining the protrusions in the openings. e.g. an edge of the lower side of an opening on the flange may extend below a protrusion on the reservoir, or an edge of the lower side of an opening on the reservoir may extend above a protrusion on the flange Similarly, the protrusions may form detents for detaining the protrusions in the openings. This may be used also when a floating cap is used instead of the cap that is heavier than water.

In a particular embodiment, the plate-shaped structure is arranged for collecting moisture.

Further advantageous embodiments according to the invention are described in the following claims.

The invention also relates to a reservoir.

Further, the invention relates to a method.

BRIEF DESCRIPTION OF THE SEVERAL
VIEWS OF THE DRAWING(S)

By way of example only, embodiments of the present invention will now be described with reference to the accompanying figures in which FIG. 1 shows a schematic perspective view of a plate-shaped structure for cultivating one or more plants according to the invention;

FIG. 3 shows a schematic perspective cross sectional view III-III of the plate-shaped structure of FIG. 1 and the reservoir of FIG. 2 in assembled state:

FIG. 4 shows an upper schematic perspective view of a second embodiment of a plate-shaped structure for cultivating one or more plants according to the invention:

It is noted that the figures show merely preferred embodiments according to the invention. In the figures, the same reference numbers refer to equal or corresponding parts.

DETAILED DESCRIPTION OF THE
INVENTION

Figure 1:
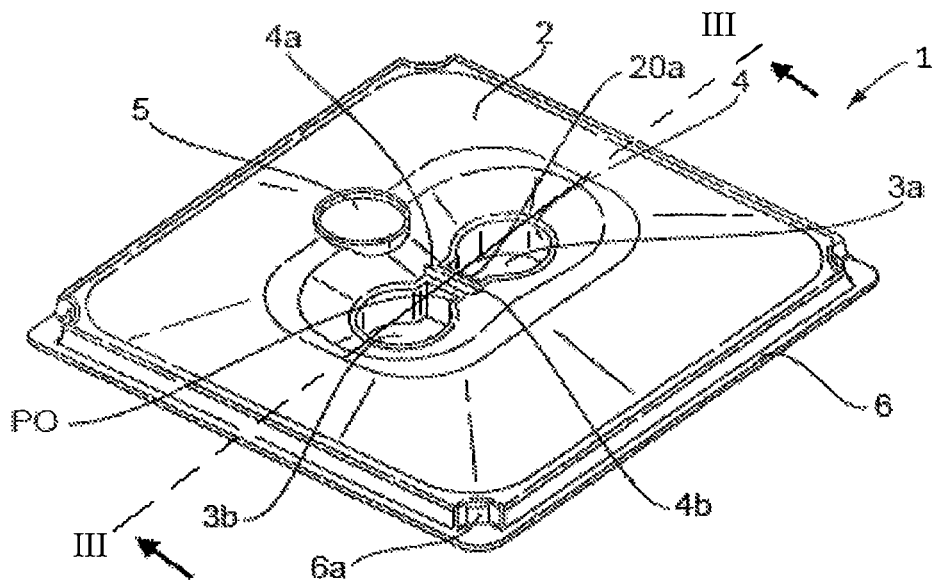

FIG. 1 shows a schematic upper perspective view of a plate-shaped structure for cultivating one or more plants according to the invention. The structure is implemented as a plate-shaped structure 1. The plate-shaped structure 1 comprises a water recovery surface 2. Further, the plate-shaped structure 1 is provided with a central opening 3a,b having a rim 4 for at least partly sideways surrounding a young plant. The plate-shaped structure 1 also includes a hole 5, for refilling a reservoir located below the plate-shaped structure 1. Further, the plate-shaped structure 1 comprises an exterior rim 6 having a profile that is corrugated in a direction mainly transverse with respect to a plane wherein the water recovery surface 2 extends. The plate-shaped structure 1 is preferably formed as a single cover module, preferably forming an airtight cover. During operation, the plate-shaped structure 1 is connected to a reservoir 10 for sealing the interior of the reservoir.

It is noted that the refilling hole 5 can be implemented as the drain opening 35 described in more detail referring to FIG. 4.

Figure 2:
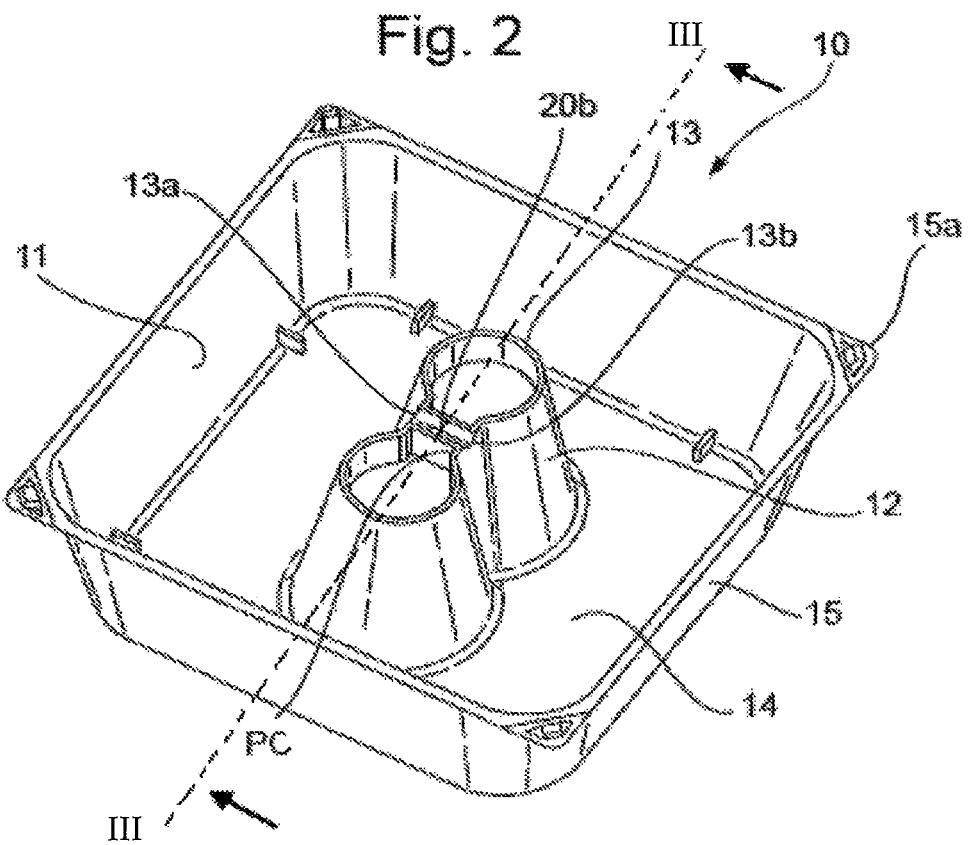
FIG. 2 shows a schematic perspective view of a reservoir according to the invention.

FIG. 2 shows a schematic upper perspective view of a reservoir 10 according to the invention. The reservoir 10 has an upwardly extending exterior side wall 11 having a exterior top edge 15 facing outwardly and an interior side wall 12 extending upwardly having a top edge 13 for forming a tube for at least partly sideways surrounding the young plant. The reservoir 10 has also a bottom 14 extending between the exterior and interior side wall 11, 12. Advantageously, the reservoir 10 can be provided with irrigation means for delivering moisture present in the reservoir 10 to a subsoil located there below. As an example, the irrigation means may include a single or a multiple number of capillary cords, injection needles or membranes traversing the bottom 14 or an exterior or interior side wall 11, 12 of the reservoir 10. The geometry of the rim 4 of the central opening 3a,b of the plate-shaped structure 1 corresponds with the geometry of the top edge 13 of the interior side wall 12 of the reservoir 10, such that when the plate-shaped structure 1 is connected to the reservoir 10, in an assembled state, the central opening rim 4 of the plate-shaped structure 1 cooperates with the top edge 13 of the interior side wall 11 of the reservoir 10, preferably in a sealing way. e.g. using a snap fitting.

According to an aspect, the plate-shaped structure 1 or the reservoir 10 or both the plate-shaped structure 1 and the reservoir 10 may comprise a stay 20 defining a predefined offset PO between opposite sections 13a,b of the top edge 13 of the interior side wall 12.

In the shown embodiment, both the plate-shaped structure 1 and the reservoir 10 include such a stay 20a,b. The stay 20a,b is here implemented as a strip integrally formed with the water recovery surface 2, forming a bridge between opposite sections. In the plate-shaped structure 1, the stay 20a interconnects opposite rim sections 4a,b for defining the predefined offset PO when the plate-shaped structure 1 is connected to the reservoir 10. Similarly, in the reservoir 10, the stay 20b interconnects opposite sections 13a,b of the interior side wall top edge 13, thus defining the predefined offset PO there between. In alternative embodiments, only the plate-shaped structure or the reservoir 10 is provided with a stay 20a,b. Further, the stay 20 may be implemented in another way. e.g. as a ridge or flange. It is noted that, in principle, the stay 20 can be integrally formed or partially integrally formed. e.g. integrally formed with a part of the plate-shaped structure. Further, the stay 20 can be formed as a single or a multiple number of discrete elements. e.g. as a separate block element mounted or clampingly positioned between opposite rim sections 4a,b or between opposite top edge sections 13a,b, respectively.

In the shown embodiment of the reservoir 10, the top edge 13 of the interior side wall 12 mainly surrounds a bar-bell shaped area. i.e. the top edge 13 has bar-bell contour. The stay 20 interconnects opposite edge sections 13a,b having the shortest mutual distance. i.e. halfway end portions of the bar-bell shaped area.

In an alternative embodiment, the top edge 13 of the interior side wall 12 mainly surrounds or encloses a disc-shaped area, a square-shaped area or an elongated area. Further, the top edge 13 of the interior side wall 12 may surround an area having an open end, such as an U-shaped area.

Preferably, the central opening rim 4 of the plate-shaped structure 1 and the top edge 13 of the interior side wall 12 of the reservoir 10 form an airtight connection. e.g. using a snap fitting, so that escape of moisture or humid air is minimized or even reduced to zero or almost zero.

In an advantageous manner, the exterior rim 6 of the plate-shaped structure 1 cooperates with the exterior top edge 15 of the reservoir 10, preferably in an airtight connection, when the plate-shaped structure 1 is connected to the reservoir 10. Then, the reservoir can be sealed from the atmosphere. Preferably, a single or a multiple number of bleeding openings can be provided in the reservoir to counteract that the process of delivering moisture to the subsoil is hindered by a sub-pressure of air in the reservoir 10.

As shown in FIG. 2, the exterior top edge 15 of the reservoir exterior side wall 11 mainly forms a square contour. Similarly, the exterior rim 6 of the plate-shaped structure 1 has a corresponding contour. In a connected state, exterior rim corner protrusions 15a of the plate-shaped structure 1 clampingly engage through corresponding corners 6a of the exterior side wall top edge 15. e.g. by firmly connecting the corresponding corners with each other, thereby stretching the plate-shaped structure between the corners of the exterior side wall top edge 15, thereby improving the air scaling behaviour of the connection between the plate-shaped structure 1 and the reservoir 10. Further, a chance is reduced that the plate-shaped structure 1 is blown away by gale or vacuum forces.

Preferably, the plate-shaped structure and the reservoir are detachably coupled, thereby providing a modular design enabling re-use of modular components. However, the plate-shaped structure and the reservoir can also be formed to provide a permanent coupling. e.g. for enhancing airtight sealing properties.

FIG. 3 shows a schematic perspective cross sectional view of a plant irrigating system including the reservoir 10 and the plate-shaped structure 1 according to the invention. In the shown embodiment, the exterior rim 6 of the plate-shaped structure 1 surrounds the top edge 15 of the exterior side wall 11 of the reservoir 10. The exterior rim 6 preferably overlaps the top edge 15 at opposite sides thereof, thereby providing a clamping connection. The top edge 15 of the reservoir's exterior side wall 11 may have a bended end portion that is mainly parallel to the bottom 14 of the reservoir 10 and extends outwardly, to enhance the connection with the plate-shaped structure 1. Alternatively, the top edge 15 is flat and extends upwardly. After connecting the plate-shaped structure 1 to the reservoir 10 the material of the plate-shaped structure may shrink, especially when exposed to a sun beam, thereby further strengthening the connection between the plate-shaped structure 1 and the reservoir 10.

In a very advantageous manner, the plate-shaped structure and/or the reservoir are manufactured from cellulose and/or paper material and/or plastic such as biodegradable plastic. The paper material may include cardboard, cellulose, such as paper tissue, paper foam and/or fiber paper.

As an example, the fiber paper may include cellulose made from coconut fiber, cotton fiber, banana fiber, jute fiber, wool fiber, straw fiber, grass fiber, hemp fiber, kenaf fiber, wheat straw paper, sunflower stalks fiber, rags fiber, mulberry paper and/or kozo.

The biodegradable plastic can be based on petroleum based plastics or renewable raw materials, both including a biodegradable additive. Plastic can be based on petroleum as raw material.

As an alternative to the embodiments shown in FIGS. 4, 5, 8, 9, 11 and 12, the water recovery surface 2 can be substantially funnel-shaped. Further, the water recovery surface 2 may have a more complex structure. As an example, the water recovery surface may comprise a receiving surface which during use makes a first angle with respect to the orientation of gravity, and a collecting surface bounding a bottom edge of the receiving surface, which collecting surface during use makes a second angle with respect to the orientation of gravity, wherein the first angle is smaller than the second angle. As an example, the water recovery surface has a corrugated profile. e.g. as described in patent publication WO 2009/078721.

It is noted that the moisture flowing structure for flowing collected moisture from the water recovery surface 2 downwardly may include an inflow opening and/or an inflow pipe extending from the water recovery surface 2 downwardly into the reservoir 10.

When the plate-shaped structure 1 is connected to the reservoir 10, a plant irrigation system is formed for protecting a young plant or tree planted in the area surrounded by the interior side wall 12 of the reservoir 10.

Preferably, material forming the plate-shaped structure and the reservoir includes water impermeable material and/or is provided with a liquid impermeable coating. e.g. on the inner and/or outer side. Further, the forming material can be coated with a biodegradable layer, preferably having a pre-determined thickness so that a desired degree of degradedness can be set. Alternatively or additionally, the degradedness of the biodegradable layer can be set by including a dosed amount of conserving material. Further, the degradedness can be set by localizing specific parts at specific heights with respect to the ground level. In general, material in the plate-shaped structure can be optimized to degrade later than material in the reservoir, due to adding additives that slow down the degrading process. This way the plate-shaped structure can function during a number of years as a ground cover and help to prevent evaporation of water, to prevent growing of competitive weeds and to add nutrients to the plant over a longer period of time.

Preferably, the base material of the plate-shaped structure and/or reservoir includes specific material that is integrated in or bound to the base material e.g. using a neutral glue 66 for a specific time period and is then disseminated into the environment, due to degradable properties of the base material. Here, the word "neutral" is to be understood as having no or only a negligible influence on the germination of plant material. In the embodiments shown in FIG. 3 the reservoir 10 is provided with a neutral glue 66 for providing the specific material to the reservoir 10. By setting the degradedness of the base material, the degree of dissemination of the specific material can be determined. In this way, the plate-shaped structure 1 and the reservoir 10 can function as slow release carriers for plant growth stimulators and repellents against animals, funguses and/or insects. In this respect it is noted environmental parameters, such as wind, moisture etc. may influence the degradedness of the base material.

As an example, the specific material may include nutrients, aromatic substances, flavourings. (artificial) fertilizer or michorizae, anti-fungal material and/or at least one insecticide. e.g. nicotine for chasing away harmful animals such as termites, and/or fungi. Further, the specific material may include seeds, symbiotic bacteria, eggs, fungi and/or spores that may germinate after leaving the base material, thereby improving the biodiversity of the irrigating system. As an example, the reservoir may include a first specific material and the plate-shaped structure may include a second specific material, as it degrades later. The number of seeds, fungi and/or spores can be determined before integrating in or attached to the base material. e.g. using glue 66.

By integrating the specific material in the base material, the base material serves as an agent for the specific material that disseminates in a dosed manner. By integrating in or attaching the specific material to the base material, the base material serves as a slow release agent for the specific material that inoculates in a dosed manner.

Alternatively or additionally, the specific material can be added into the reservoir, prior, during or after planting a young plant to be protected by the plate-shaped structure and/or reservoir. e.g. in combination with an amount of soil placed in the reservoir so that the specific material is provided to the subsoil and the root structure of the young plant via the dosed flow of water from the reservoir.

Figure 5:
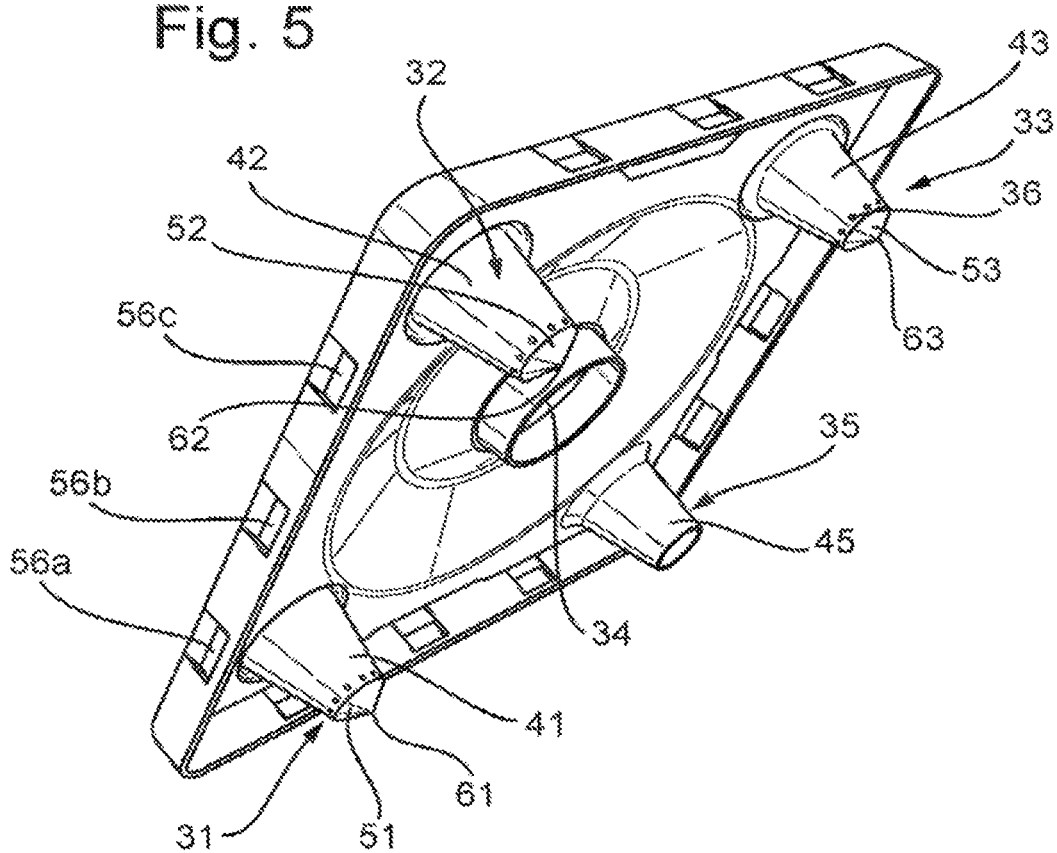
FIG. 5 shows a lower schematic perspective view of the plate-shaped structure of FIG. 4.

FIG. 4 shows an upper schematic perspective view of a second embodiment of a plate-shaped structure for cultivating a plant according to the invention. FIG. 5 shows a lower schematic perspective view of the plate-shaped structure of FIG. 4. The plate-shaped structure 1 comprises a generally flat upper surface 30 provided with three cavities 31, 32, 33, each of the cavities having a sidewall 41, 42, 43 and a bottom portion 51, 52, 53. The cavities may have various shapes, such as a rounded, oval, square, rectangular or diamond shape. The bottom portion includes aperture 61, 62, 63 e.g. in the form of holes or slits traversing the plate-shaped structure 1 to enable moisture communication between the cavities 31, 32, 33 and the inner space 80 of the reservoir 10. The sidewalls 41, 42, 43 of the cavities 31, 32, 33 are tapered downwardly.

When using the plate-shaped structure, plant material such as seeds, seedlings, cuttings, rooted cuttings, plug plants, vegetables and/or pot plants can be provided in the cavities. By providing moisture to said plant material, it may grow in a hydroponic way. Generally, the roots may develop in the humidity and water below them in a reservoir 10. Depending on a speed of the degrading process of the reservoir 10, the roots are eventually allowed to penetrate the soil so that the plants that are planted in the cavities can establish themselves.

Further, the generally flat upper surface 30 is provided with a central opening 34 having a rim 34a for at least partly surrounding the central plant or plants.

In an alternative embodiment, the generally flat upper surface 30 does not include a central opening 34. A reservoir can then be realized without an interior side wall 12. Then, a further cavity may be realized in a central portion of the generally flat upper surface 30. e.g. for optimizing an amount of plant material to grow in a hydroponic way, to be put on the reservoir 10. In such a case the generally flat upper surface 30 can not only be used in combination with a reservoir, but can alternatively be applied directly on the soil and this way the plant material can grow directly into the soil instead of in the reservoir 10.

The generally flat upper surface 30 also includes a drain opening 35 provided with a sidewall 45 extending downwardly in a tapered manner for flowing moisture that is received on the generally flat upper surface 30 downwardly. e.g. in the inner space of the reservoir. The drain opening cooperates with a cap such as a ball shaped cap as described below thereby serving an inverted siphon function, allowing fluid to flow through the drain opening while, on the other hand, minimizing any amount of evaporation of moisture stored in the reservoir. In the shown embodiment, the drain opening has a sidewall 45, no bottom portion. Generally, a bottom portion can be provided, however, such that a pre-defined flow rate of water flowing downwardly can be achieved. In principle, the generally flat upper surface can also be implemented without a drain opening. e.g. when the plate-shaped structure is placed on the soil.

The sidewalls 41, 42, 43 are preferably provided with a multiple number of perforation openings 36, such as slits, forming a perforation line, so that the bottom portion 51, 52, 53 of the cavities 31, 32, 33 can be easily removed. Then, a seed, a rooted plug including plant material or a cutting can be inserted in the cavities. The plug volume seals the opening to the reservoir, thereby counteracting undesired moisture evaporation.

As shown in FIG. 4, the shown embodiment includes upwardly raised edges 46, 47, 48 counteracting that moisture received on the generally flat upper surface 30 flows into the cavities 31. 32, 33. The edges 46, 47, 48 surround the corresponding cavities. Advantageously, the edges can be interrupted, in the shown embodiments at corner facing locations 46a. 47a. 48a, to allow a certain amount of moisture to flow from the plate-shaped structure into the cavities 31, 32, 33. Alternatively, the edges 46, 47, 48 are uninterrupted, forming circular barriers enclosing the cavities 31, 32, 33 on the plate-shaped structure. An edge is wholly or partly upwardly raised. Now, said moisture entirely flows towards the drain opening 35, also called inverted siphon, to fill the reservoir 10. Advantageously, the drain opening is located at a lower portion of the generally flat upper surface to minimize any moisture remaining on the plate-shaped structure 1.

The cavities 31, 32, 33 are mainly evenly distributed in a circumferential direction on the generally flat upper surface 30. It is noted that more or less cavities can be provided. e.g. four, five or six cavities, or two cavities. Also, a single cavity can be provided. Further, another cavity distribution can be provided. e.g. a more homogeneous two-dimensional distribution on the general flat upper surface 30).

The cavities, also called cones may have a circular, square, rectangular or polygon geometry. The cones may have an opening in the bottom of approximately 1 to 2 mm diameter. The perforation openings 36 between the sidewalls 41, 42, 43 and the corresponding bottom portion 51, 52, 53 forming a perforation line may have an elongated aperture geometry commensurating with the plate-shaped structure. The cones may have two functions: they help that after producing we can stack the plate-shaped structures in a horizontal way, especially if the cavities are distributed evenly over the plate-shaped structure. If there would be only an inverted siphon on one topside and no cones on the other top sides, then the plate-shaped structures could not be stacked in a horizontal way, but they would be stacked on such a way that the stack would go aside to one direction, away from the side where the inverted siphon is located. The cones may have a second function also. They can be filled with soil, clay particles or a planting pot. e.g. that contain one or more seeds of plants or trees. The collected moisture in the box will evaporate through the bottom opening and make the bottom of the cone humid. In combination with the seed or other plant material this will lead to germination and/or growth. The seed can root through the opening and cellulose of the plate-shaped structure and find water in the reservoir. It will then colonize the box and this way lead to the development of plants that surround the plant or tree that was planted in the central opening. Instead of a seed we can also put a cutting through the opening in the cone, with the bottom of the cutting just inside or a little above the water level in the box. The humidity will stimulate the rooting of the cutting. The cones can be either closed, open or with a weak structure in the bottom-made with a needle or through adding less cellulose-so that the root can easier penetrate. The seeds or cuttings in the cones will grow to plants and eventually colonize the surrounding around the planted tree in the middle of the plate-shaped structure. The plate-shaped structure can also function as an individual item without the water reservoir. It is then made without an inverted siphon and/or a central opening 34. Then, the plate-shaped structure does include cones and can be applied directly on the soil. The collected moisture will be directed into the direction of the cones. It will enter the soil through the bottom of the cones. During the rainy period the seeds will germinate—or the cuttings or other plant material will root—and their pivotal roots will penetrate the humid soil below the cones.

Optionally, the plate-shaped structure may have a network of small channels on the surface in the form of a spider web, which not only transports the moisture but also function as a 'bonestructure' to make the horizontal cover stronger, which has an integrated inverted siphon opening to which the channels transport the moisture, which has a topside on the outside and a topside on the inside that is higher than the channels and the opening, this way taking care that all the collected water enters in the inverted siphon opening.

Further, the plate-shaped structure may also be provided with an overflow to prevent the water to enter the middle opening and wash the roots out when the reservoir is completely filled. The central opening 34 may be implemented with various geometries, adapted for different kinds of plants and circumstances. The shape of the central opening may be circular, square, polygon. e.g. with eight corners, rectangular. In an assembled state, the plate-shaped structure 1 and the reservoir 10) are coupled, as described in more detail below. The generally flat upper surface 30 includes a downwardly oriented flange 55 at the periphery, so that the plate-shaped structure can be stored and transported with the flat upper surface 30 oriented mainly vertically. i.e. with the downwardly oriented flange 55 on a supporting storing and/or transporting structure. In the shown embodiment, the downwardly oriented flange 55 at the periphery are part of a cap structure 84 for clampingly receiving the upwardly extending exterior sidewall of the reservoir. The cap structure 84 has the shape of an inverted U-profile including a first edge portion 81 upwardly extending from the generally flat upper surface 30, a generally flat top portion 82 adjacent to the first edge 81, and a second edge portion 83 downwardly extending from the top portion 82. Here, the second edge portion 83 is part of the downwardly oriented flange 55. The generally flat top portion 82 of the cap structure 84 may have a mainly constant width. However, in a specific design, the width of the generally flat top portion may be position dependent. In the shown embodiment, said generally flat top portion has wider sections 55c at a central position along a side of the plate-shaped structure, thereby providing improved rigidity to the plate-shaped structure. Similar to the embodiment shown in FIG. 1, openings 56a-c are provided at the outer edge of the generally flat upper surface 30 for clamping the plate-shaped structure 1 to the reservoir 10. Here, said openings 56a-c are provided in the downwardly oriented flange 55.

Figure 6A:
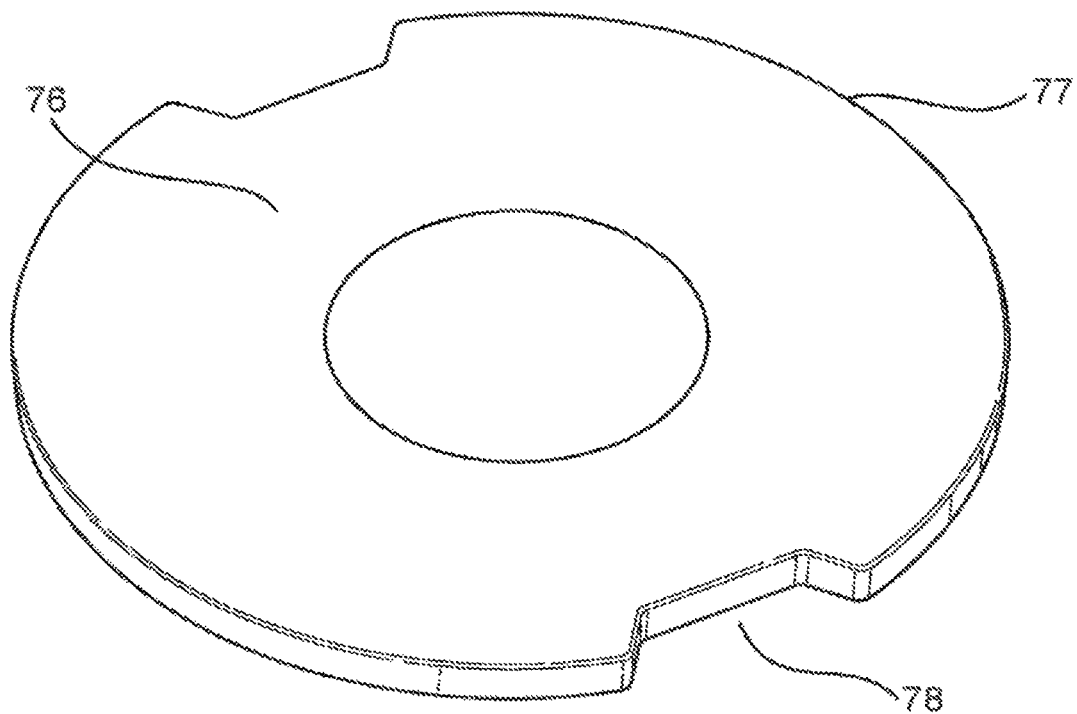
FIG. 6a shows a perspective schematic view of a covering cap positioned in an upper portion of the drain opening of the plate-shaped structure shown in FIGS. 4 and 5.

FIG. 6a shows a perspective schematic view of a covering cap 76 positioned in an upper portion of the drain opening 35 of the plate-shaped structure shown in FIGS. 4 and 5. The covering cap 76 has a generally flat central portion and an outer contour 77 matching a cross sectional geometry and dimension at an upper portion of the downwardly tapered sidewall 45 of the drain opening 35. In the shown embodiment, the covering cap 76 is generally disc-shaped. Further, the covering cap is provided with a notch 78 at its outer contour 77 for allowing fluid to pass the covering cap 76 from the generally flat surface 30 towards a lower part of the drain opening 35. Alternatively or additionally, the covering cap 76 is provided with an opening allowing fluid to pass.

Figure 6B:
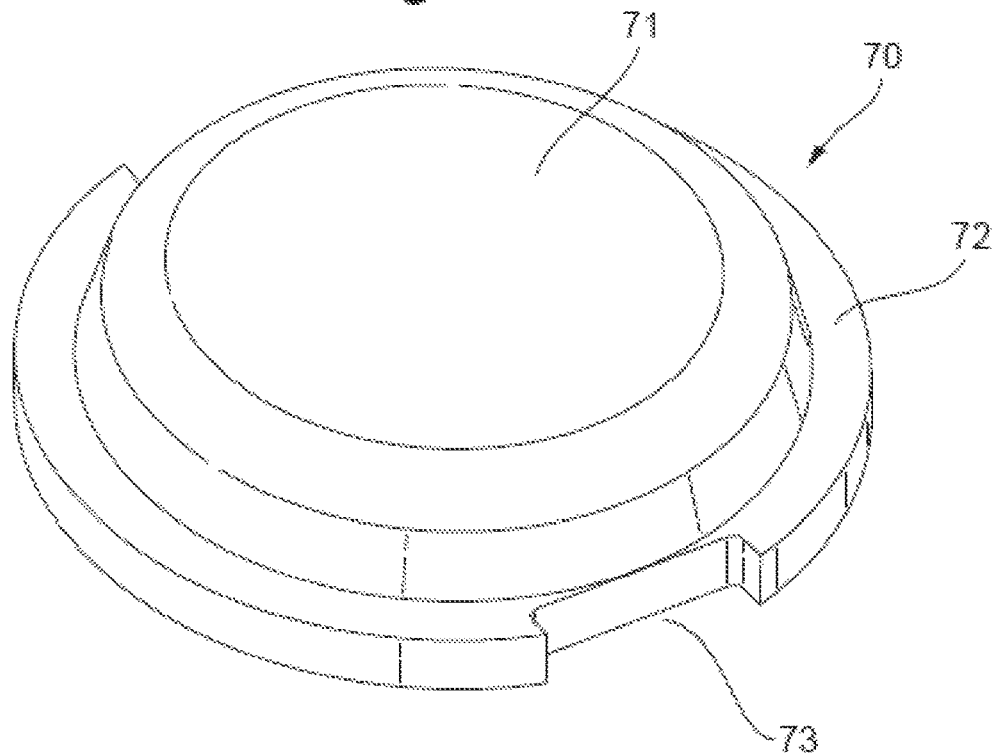
FIG. 6b shows a perspective schematic view of a cap positioned in the drain opening of the plate-shaped structure shown in FIGS. 4 and 5.

FIG. 6b shows a perspective schematic view of a cap 70 positioned in the drain opening 35 of the plate-shaped structure shown in FIGS. 4 and 5. The cap 70 has a generally flat central portion 71 and a downwardly corrugated edge portion 72 having an outer contour that is in conformity with a cross sectional geometry of the downwardly tapered sidewall 45 of the drain opening 35. In the shown embodiment, the cross sectional geometry of the drain opening sidewall 45 is circular. Then, also the outer periphery of the cap 70 is circular, thereby optimizing sealing properties.

The downwardly corrugated edge portion 72 of the cap 70 is provided with a notch 73 so that moisture may flow through the drain opening 35 into the reservoir 10. Additionally or alternatively, a single or a multiple number of openings are provided in the generally flat central portion 71 and/or in the corrugated edge portion 72 to enable moisture flow.

Figure 7:
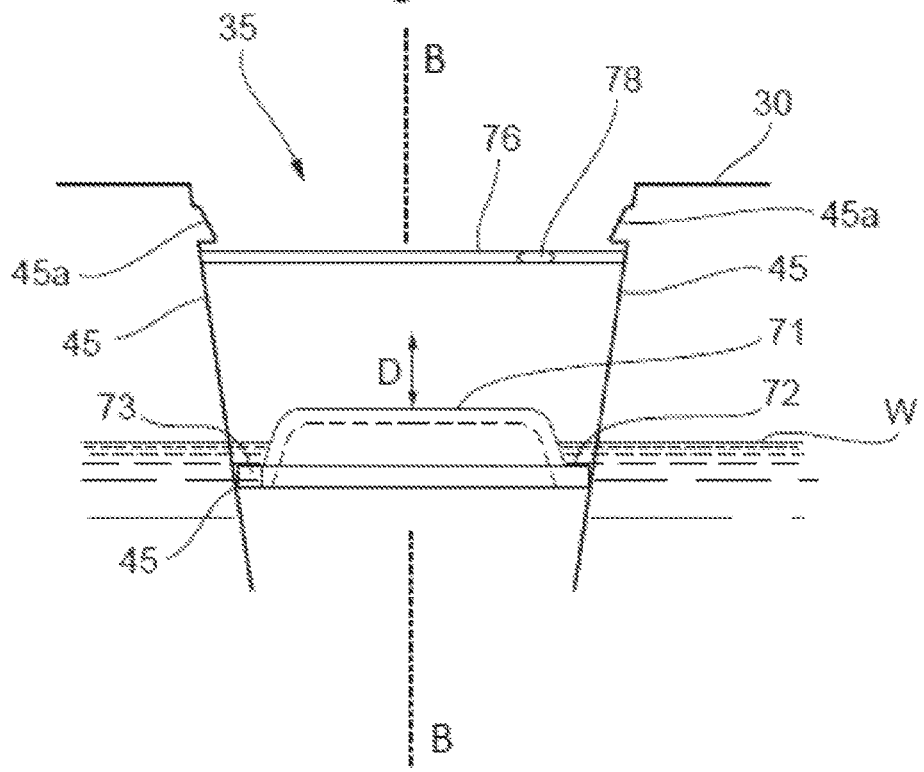
FIG. 7 shows a schematic cross sectional view VII-VII of the drain opening of the plate-shaped structure shown in FIGS. 4 and 5 with a covering cap.

FIG. 7 shows a schematic cross sectional view of the drain opening 35 of the plate-shaped structure shown in FIGS. 4 and 5. The covering cap 76 such as a ball shaped cap is located at an upper portion upwards of the drain opening sidewall 45, adjacent to the generally flat upper surface 30. In the shown embodiment, the covering cap 76 is locked by locking members 38 extending from the drain opening sidewall 45 radially inwardly into the opening. However, the covering cap 76 can be fixed in another manner. e.g. by clamping the covering cap 76 in the sidewall 45. The sealing cap 70 is located at a lower portion of the drain opening sidewall 45, but can, in principle, move upwardly and downwardly in a certain range in a direction D mainly parallel to a body axis of symmetry B of the drain opening 35. The outer contour of the cap 71 is designed such that it matches a cross sectional geometry and dimension of the downwardly tapered sidewall 45 of the drain opening 35, at the above-mentioned lower portion thereof. e.g. close to or at the lower end of the drain opening sidewall 45. The cap 70 has a weight that is greater that the weight of an amount of water with the same volume of the cap. i.e. greater than one kilogram multiplied by the volume of the cap in cubic decimeters. Preferably, the weight is at least 1.1 larger and more preferably at least twice as large. Cap 70) comprises a material having a density that is higher than that of water, thus providing an downwardly oriented force when the cap 70 is submerged in water. Of course cap 70 may also comprise a hollow space, or a space filled with lighter material, as long as the overall weight is sufficient to prevent floating in water.

During use, the cap 70 slides downwardly in the drain opening 35 until the periphery contacts the sidewall of the drain opening 35, at the sidewall lower portion, thereby nearly sealing the opening and minimizing moisture evaporation. Due to roughness of the edge of cap 70 and/or the sidewall surface part that are in contact with each other water can seep down between cap 70 and the sidewall surface part. By providing a notch or opening or channels in the surface of cap 70 and/or the sidewall surface, moisture flow may be enhanced. Preferably, a seepage rate of at least one 0.2, more preferably 0.5 and preferably liter per minute is provided for the structure. When the rainfall is so high that the water level W rises, above the cap, the cap remains substantially in position, lodged against the side wall. Excessive rainfall will flow off the structure once the water level rises above the drain opening.

By providing the cap 70, the greatest area on the water is covered, keeping the greatest part of the opening area protected against evaporation. Further, by providing the covering cap 76, a shadow is shed on the cap 70, thereby even further reducing an evaporation process. The seepage along cap 70 allows moisture to enter the reservoir. e.g. during a rainy period, but on the other hand, seals the opening entirely or almost entirely during periods of drought, this way preventing loss of precious moisture in the reservoir. In addition, the covering cap 76 provides a further protection against evaporation.

It is noted that, in another embodiment, only the cap is applied in the drain opening, not the covering cap. e.g. in order to save assembling steps.

It is also noted that the cap and/or the covering cap may have another design. In FIG. 7 as an example, the cap may be implemented as a clay ball. When the cap is implemented as a clay ball, it can be used without a notch or opening, thereby further reducing evaporation. The outer contour of the ball 71 is designed such that it matches a cross sectional geometry and dimension of the downwardly tapered sidewall 45 of the drain opening 35, at the above-mentioned lower portion thereof. e.g. close to or at the lower end of the sidewall 45 of the drain opening.

Figure 8:
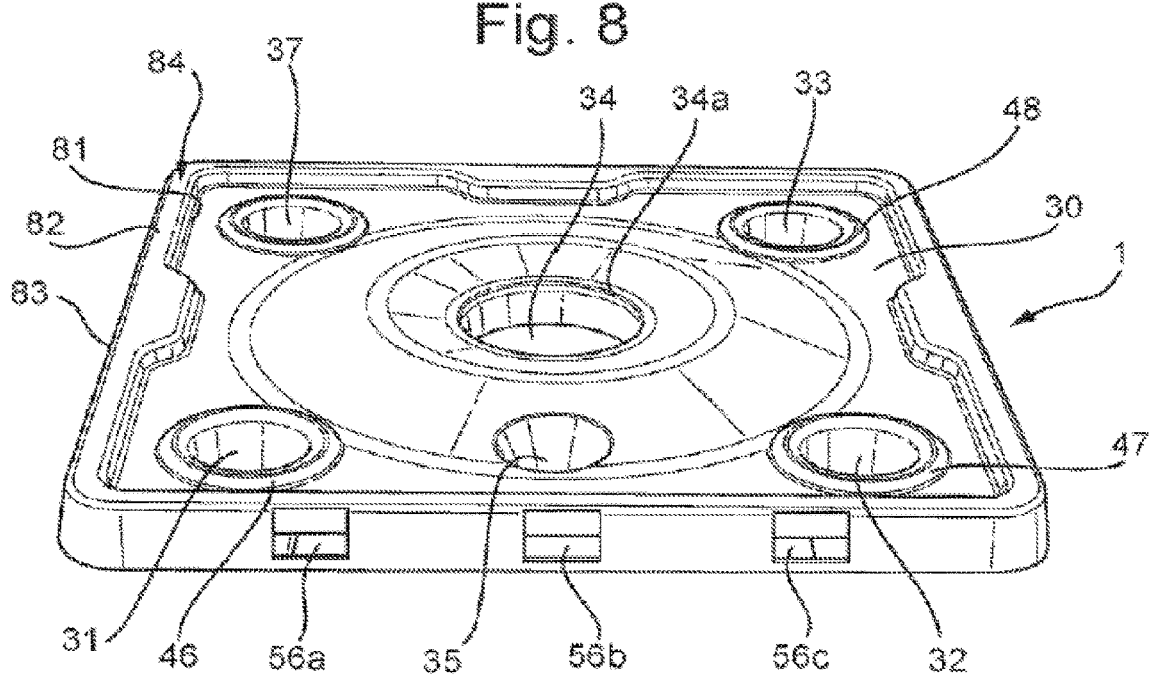
FIG. 8 shows an upper schematic perspective view of a third embodiment of a plate-shaped structure for cultivating a plant according to the invention.
Figure 9:
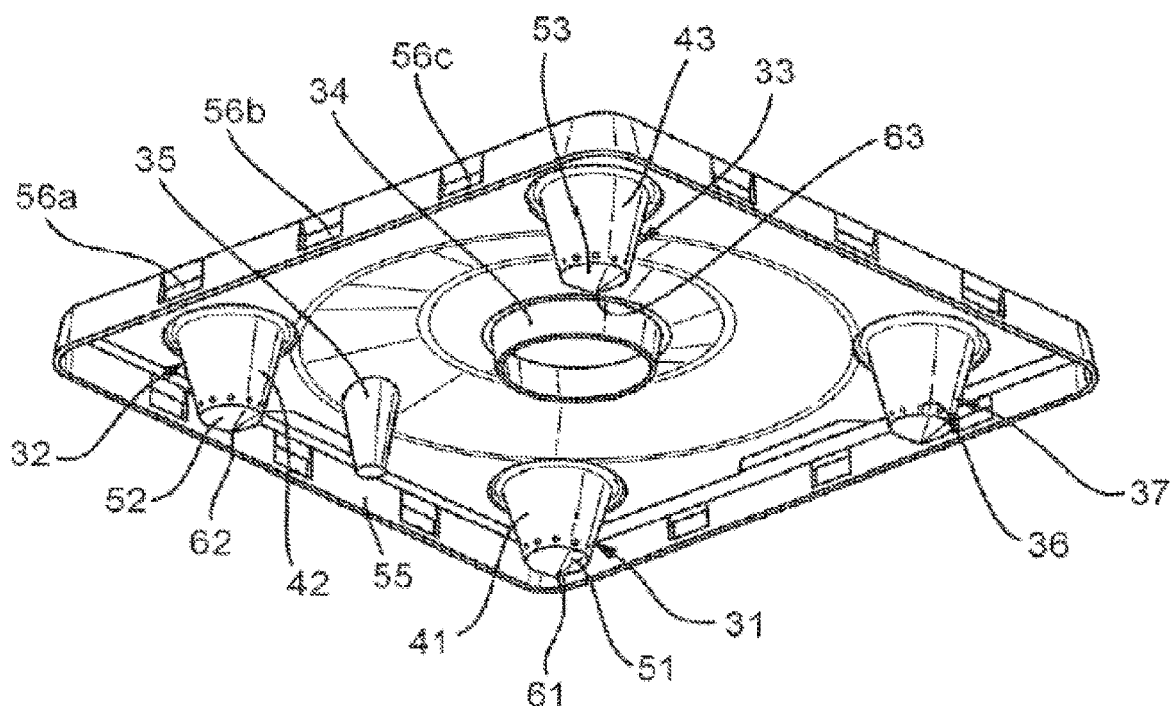
FIG. 9 shows a lower schematic perspective view of the plate-shaped structure of FIG. 8.

FIG. 8 shows an upper schematic perspective view of a third embodiment of a plate-shaped structure 1 for cultivating a plant according to the invention. FIG. 9 shows a lower schematic perspective view of the plate-shaped structure 1. Compared to the second embodiment shown in FIGS. 4 and 5, the location of the drain opening 35 has shifted, while a fourth cavity 37 has been realized at the previous location of the drain opening.

Figure 10:
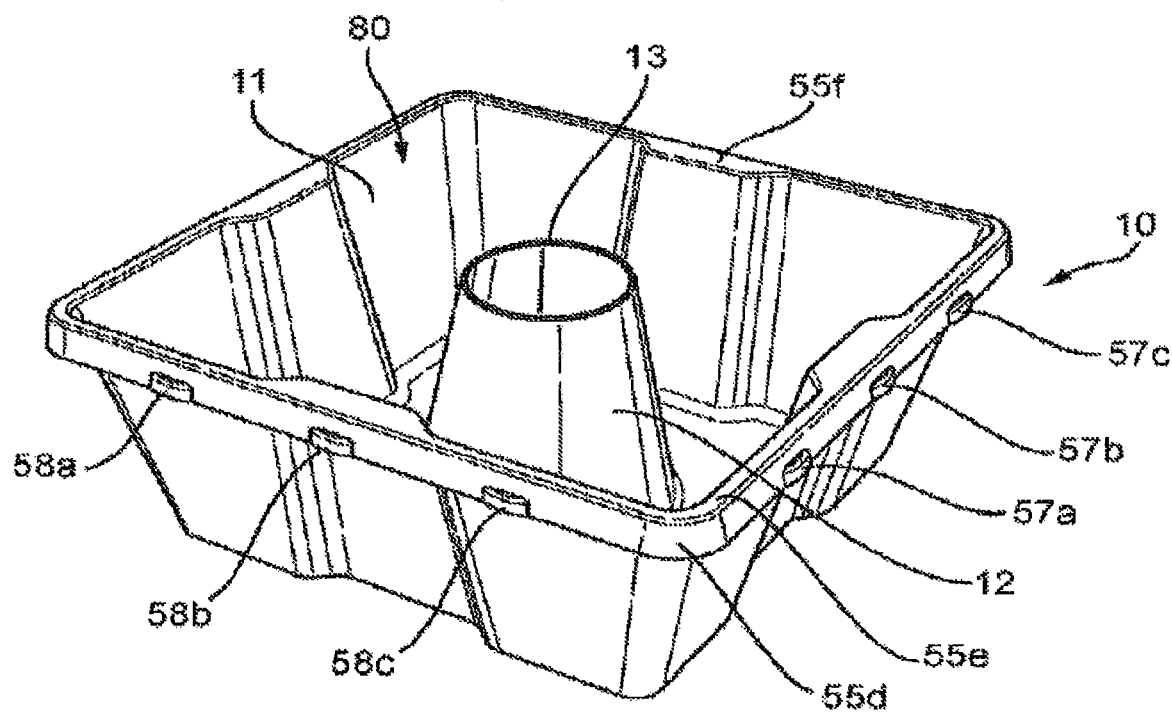
FIG. 10 shows a schematic perspective view of a second embodiment of a reservoir according to the invention.
Figure 11:
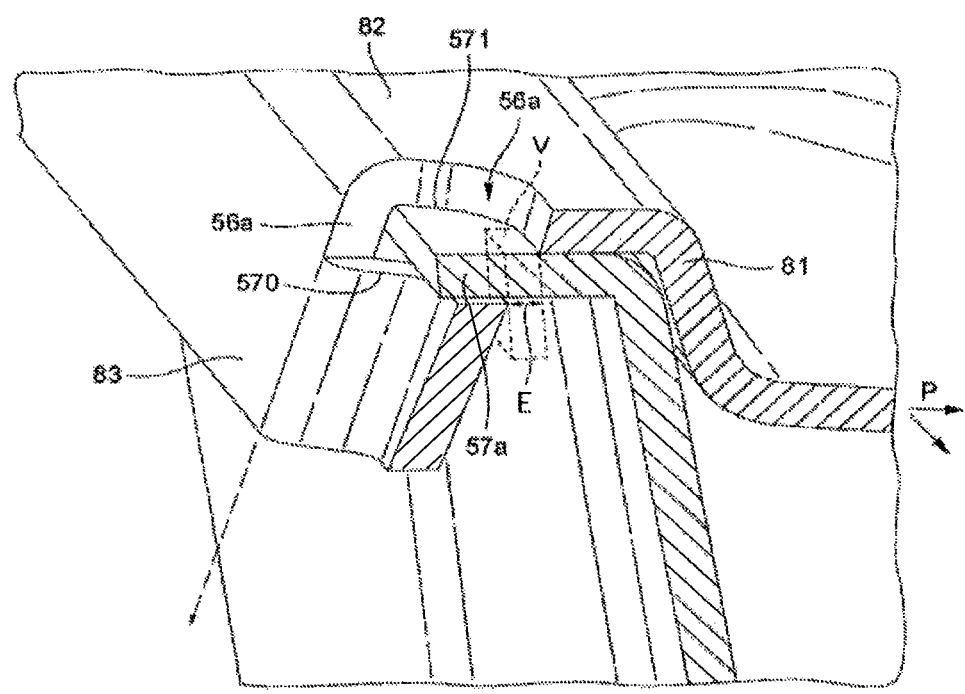
FIG. 11 shows a schematic cross sectional view XI-XI of the plate-shaped structure and the reservoir of FIG. 12.

FIG. 10, 11, 12 show a schematic perspective view of a second embodiment of a reservoir according to the invention. Here, the exterior sidewall 11 of the reservoir 10 comprises outwardly extending protrusions 57a-c. 58a-c for traversing corresponding openings 56a-c of the plate-shaped structure 1. It is also noted that corresponding openings in the plate-shaped structure 1 can contain detents 570 that fix a protrusion 57a, for traversing corresponding openings 56a of the plate-shaped structure 1. The detents 570 may be realized e.g. as an edge of the lower side of the opening 56 on the flange. Then, a lower edge may be formed by the detent 570 while an upper edge 571 of the opening 56 is formed by the generally flat top portion 82 of the inverted U-profile of the plate-shaped structure 1, as described referring to FIG. 4. When the edge extends below a protrusion 57a on the reservoir it detains the protrusion 57a.

In a specific embodiment, the opening 56a is provided in the generally flat top portion 82 and the second edge portion 83 extending downwardly from the top portion 82. Further, the detent 570 may be folded back from the second edge portion 83 towards the first edge portion 81 of the inverted U-profile forming an inwardly staggered supporting element supporting the protrusion 57a that extends into the opening 56. In a connected state of the plate-shaped structure and the reservoir 10, the protrusion 57a is clamped, in a vertical direction, between the lower and upper edge of the opening 56. i.e. between the detent 570 and upper edge 571. The protrusion 57 functions as a tongue that is clamped between the lower and upper edge or lip of the opening 56. Further, the protrusion 57a may also be locked in a horizontal direction, transverse to the vertical direction, viz, by the first edge portion 81 of the inverted U-profile on one side and by an inner edge interconnecting the top portion 82 and the second edge portion 83 of the inverted U-profile. Then, a reliable and firm connection between the plate-shaped structure 1 and the reservoir 10 is obtained having a further advantage of reduced evaporation of moisture that is present in the reservoir as the opening 56 is almost entirely closed by the protrusion 57a.

In a highly preferred embodiment, the folded back detent 570 does not extend beyond or below the upper edge 571 of the opening 56 so that the plate-shaped structure can be made using a pulp moulding process. In the embodiment shown in FIG. 11, the fold back detent 570 maintains an distance E with respect to the upper edge 571 in a direction away from the second edge portion 83. The fold back detent 570 leaves a volume V between the lower edge and the upper edge 571, the volume V having a distance E in the plane P wherein the plate-shaped structure 1 extends.

Similarly, a detent may be realized by an edge of the lower side of an opening on the reservoir. When the edge extends above a protrusion on the flange it detains the protrusion. Alternatively or combined with this, the protrusions may be constructed in a similar way to form detents for detaining the protrusions in the openings.

Figure 12:
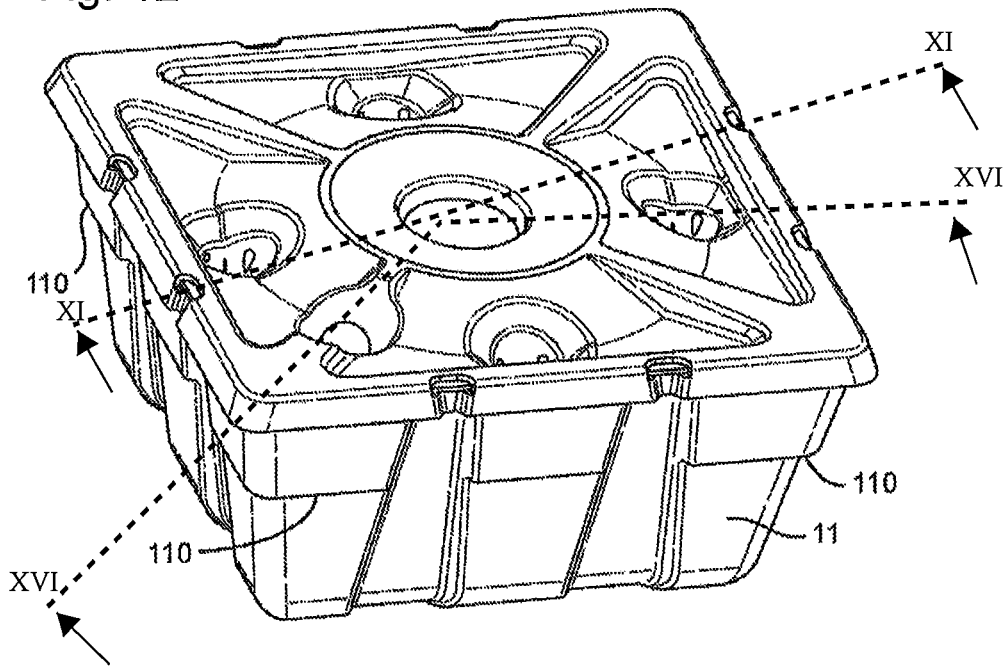
FIG. 12-13 show details of rims, protrusions and detents to fix the cover.
Figure 13:
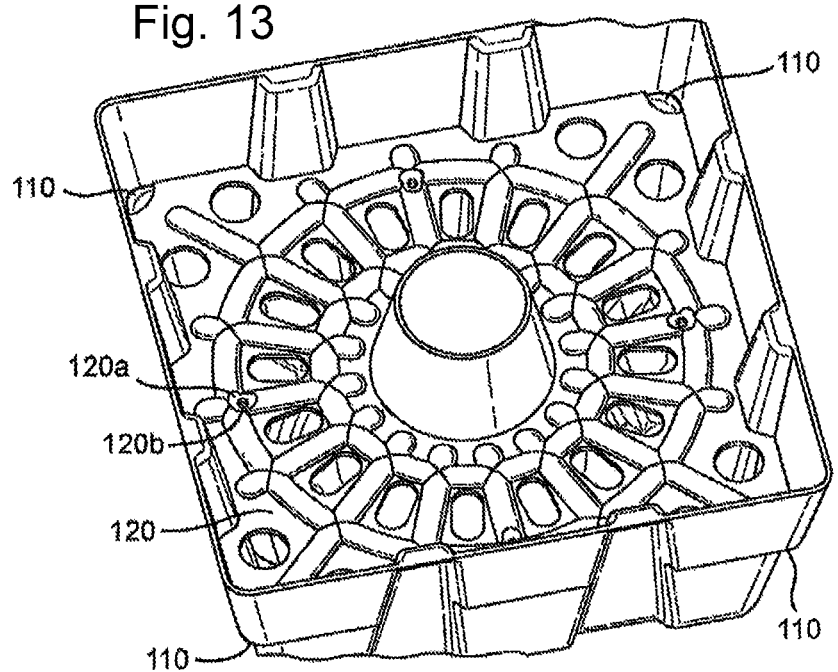

In the embodiment shown in FIG. 12 a rim 110 is provided in the side wall of the reservoir (giving the side wall a step shaped cross-section) thereby reducing a risk that the straight sidewall collapses to the inside, caused by pressure from the soil outside the box. The rim 110 may be located substantially halfway between the bottom and the top of the reservoir. The rim 110 may extend along the entire circumference of the exterior sidewall 11, however, as an alternative, an interrupted rim 110 along part of the circumference may be used. In the illustrated embodiment, the rim 110 is present selectively at each corner of the exterior sidewall 11 of a rectangular (preferably square) reservoir and in central sections between the corners. The exterior sidewall 11 may flanged twice outwardly, at its upper portion, forming an inverted U-shaped profile FIG. 13 shows an embodiment, comprising a further plate 120 in the reservoir, outer edges of the plate resting on the rim 110. Such a plate 120 may be used to further reduce the risk of collapse of the side walls and/or the plate-shaped structure. Preferably, the further plate 120 has openings below the cavities to allow roots to pass. Preferably, these openings are so small that at least the edges of the cavities may be supported by the further plate and through them the plate-shaped structure. Preferably, the further plate has openings to allow water to pass.

Figure 14:
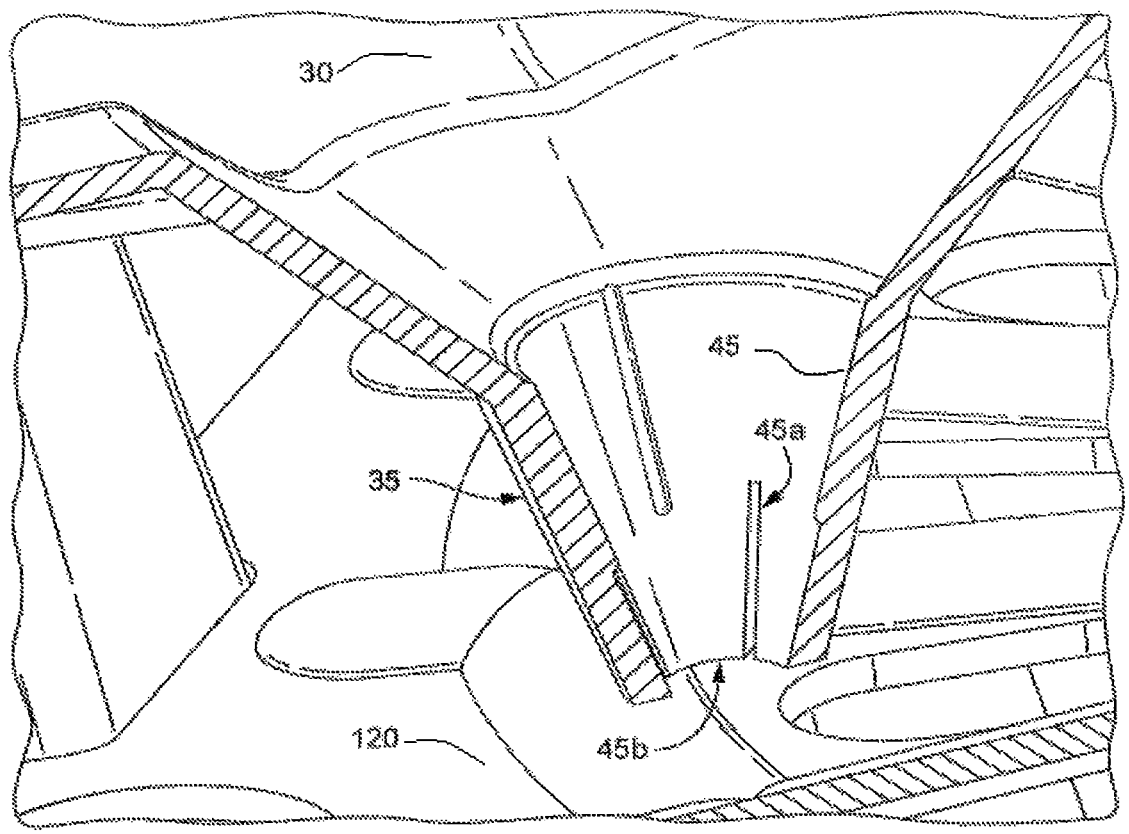
FIG. 14 shows a portion of the cross sectional view, shown in FIG. 16, of a drain opening provided in a fourth embodiment of a plate-shaped structure of FIG. 12 according to the invention.

FIG. 14 shows a schematic perspective cross sectional view of a drain opening 35 provided in a fourth embodiment of a plate-shaped structure 1 according to the invention. The drain opening 35 has a sidewall 45 extending downwardly in a tapered manner for flowing moisture that is received on the generally flat upper surface 30 downwardly into the reservoir. In the shown embodiment, the drain opening 35 has no bottom portion.

Further, as shown in FIG. 14, the sidewall 45 of the drain opening 35 can be provided with slits 45a running downwardly to a lower edge 45b of the sidewall 45 so that a lower portion of the sidewall 45 can be moved radially outwardly, preferably temporarily. e.g. by pressing a tube, funnel or other foreign object into the drain opening 35, thereby enlarging the opening so that a process of refilling the reservoir with water can be performed quickly.

Figure 15:
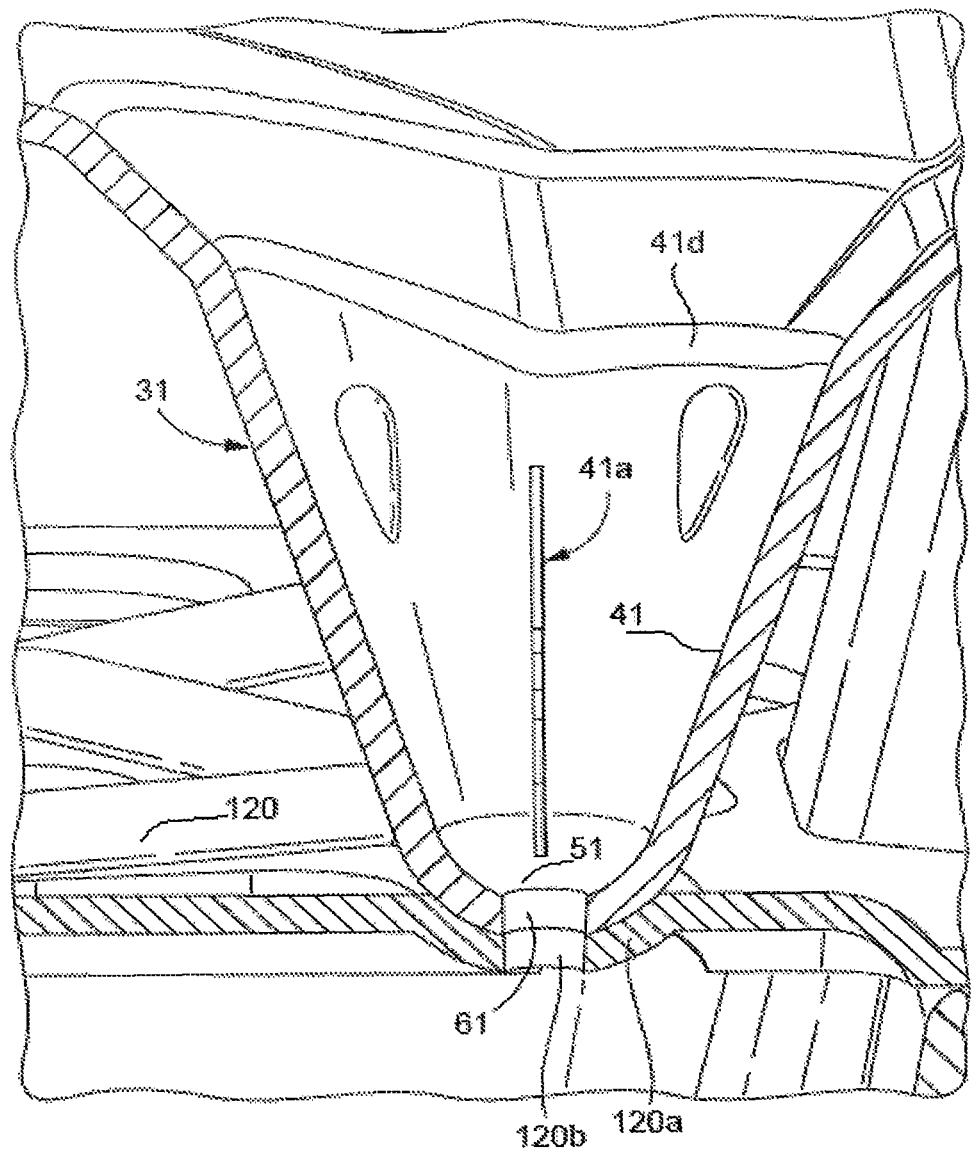
FIG. 15 shows a portion of the cross sectional view, shown in FIG. 16, of the cavity provided in the plate-shaped structure of FIG. 12.

FIG. 15 shows a schematic perspective cross sectional view of a cavity 31 provided in the plate-shaped structure 1 of FIG. 14. The cavity 31 has a sidewall 41 tapered downwardly to a cavity bottom portion 51 that is provided with an aperture 61 to enable moisture communication between the interior of the cavity 31 and the inner space 80 of the reservoir 10. The cavity bottom portion 51 is supported by the further plate 120 described referring to FIG. 13, preferably in a curved receiving portion 120a that is also provided with an aperture 120b aligned with the aperture 61 of the cavity bottom portion 51. By using the further plate 120 to support the cavity bottom portion 120a a risk that the plate-shaped structure 1 collapses is further reduced. Optionally, the sidewall 41 of the cavity 31 can be provided with a single or a multiple number of slits 41a as shown in FIG. 15 to allow roots to grow also radially outwardly. Further, the cavity sidewall 41 can be provided with a cutting edge 41d that is preferably pre-cut or perforated so that a cavity sidewall 41 below said cutting edge 41d can be easily cut or torn off. e.g. for providing an opening 95 receiving a pot as shown in FIG. 17 below.

Figure 16:
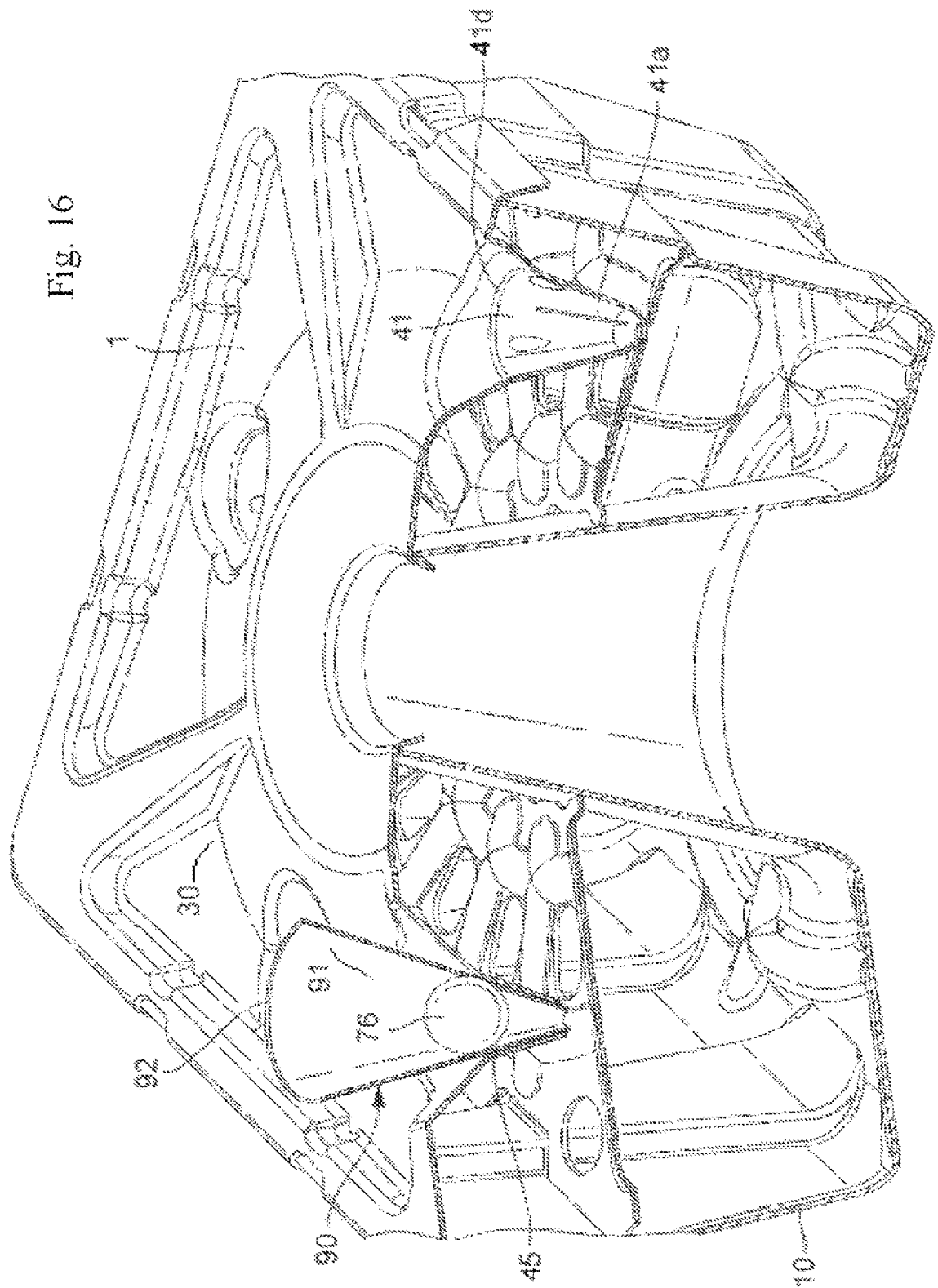
FIG. 16 shows a schematic perspective cross sectional view XVI-XVI of the plate-shaped structure of FIG. 12 and a third embodiment of a reservoir according to the invention in an assembled state and provided with a funnel.

FIG. 16 shows a schematic perspective cross sectional view of the plate-shaped structure 1 of FIG. 14 and a third embodiment of a reservoir 10 according to the invention in an assembled state. The plate-shaped structure 1 is provided with a funnel 90 that is received in the drain opening 35. The funnel 90 preferably has a tapered sidewall 91 that has a similar geometry as the sidewall 45 of the drain opening 35, for stability reasons. Further, the funnel 90 extends upwardly so that an upper edge 92 of the sidewall 91 is located above the generally flat upper surface 30 of the plate-shaped structure 1. Then, the reservoir 10 can be refilled also if the reservoir is partially or completely buried in the soil. In the shown embodiment, a ball shaped cap 76 is located inside the sidewall 91 of the funnel 90 providing the siphon function described above.

Figure 17:
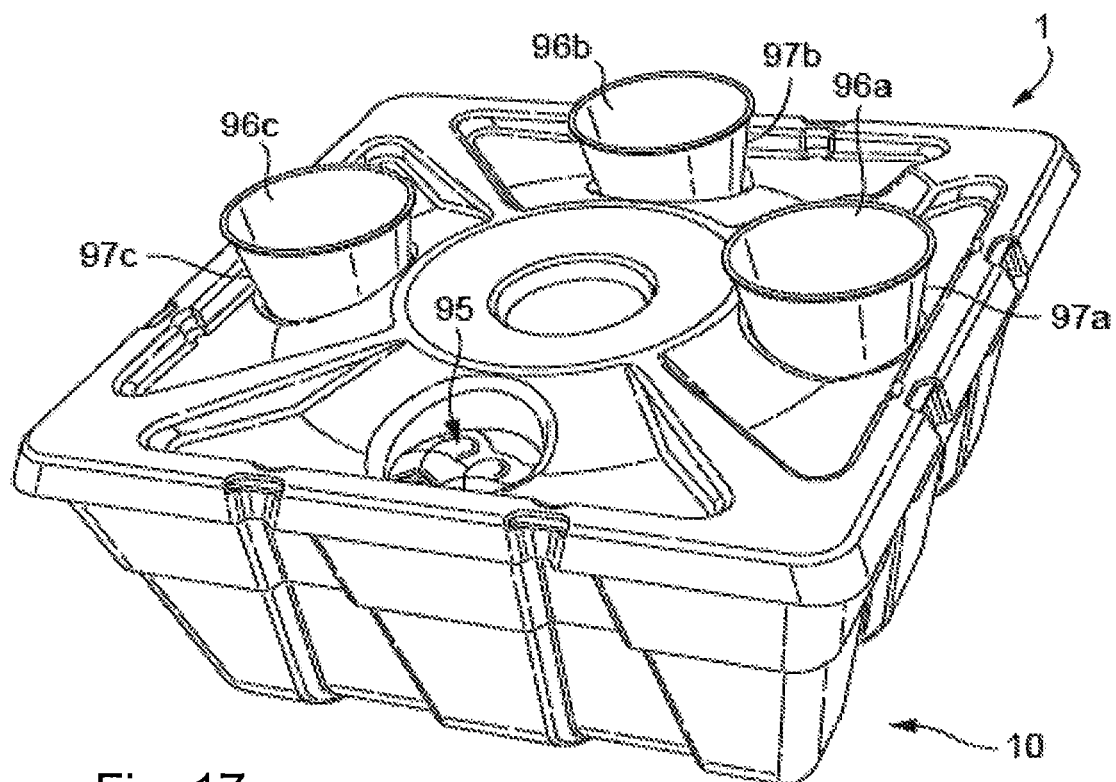
FIG. 17 shows a schematic perspective view of the assembled plate-shaped structure and reservoir of FIG. 16 receiving a number of pots.

FIG. 17 shows a schematic perspective view of the assembled plate-shaped structure 1 and reservoir 10 of FIG. 16 wherein a number of pots are received on the plate-shaped structure 1. Here, the cavities 31-31 have been removed thus forming openings 95 in the plate-shaped structure 1 supporting pots 96a-c having downwardly tapered sidewalls 97a-c. The pots 96 can be used for cultivating plant material such as seeds, seedlings, cuttings, rooted cuttings, plug plants, vegetables and/or pot plants. Preferably, the pots are provided with a single or a multiple number of openings in their bottom to enable moisture or vapour from the reservoir to penetrate the interior of the pots.

Figure 18:
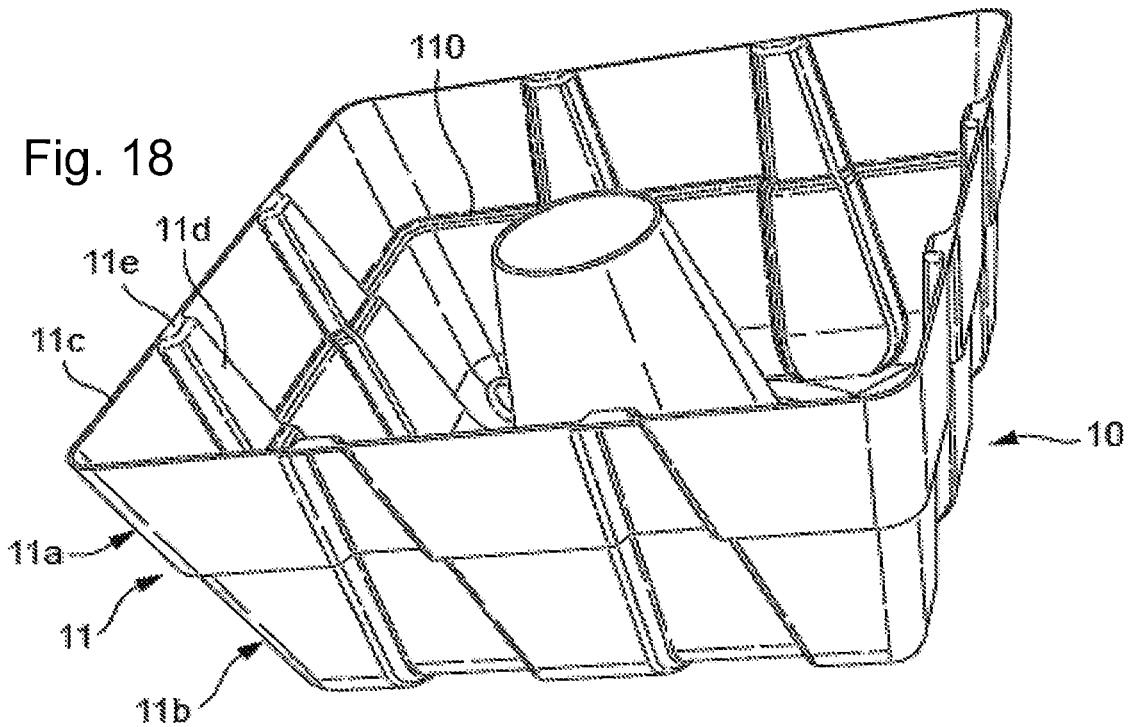
FIG. 18 shows a schematic perspective view of the reservoir of FIG. 16.

FIG. 18 shows a schematic perspective view of the reservoir 10 of FIG. 16. The reservoir 10 is provided with a rim or rib 110 located substantially halfway between the bottom and the top of the reservoir. In the shown embodiment, the rim 110 runs along the entire circumference of the exterior sidewall 11, thereby providing additional strength to the reservoir 10 reducing a risk of collapsing. In the shown embodiment, the side wall has an upper portion 11a and a lower portion 11b joined by the rim or rib 110. The side wall upper portion 11a is staggered outwardly relative to the side wall lower portion 11b. It is noted that, alternatively, the upper portion 11a and the lower portion 11b are mutually aligned. Further, the exterior sidewall 11 in the embodiment shown in FIG. 18 extends upwardly towards a straight edge portion 11c, without an inverted U-shaped or other curved or folded profile. Additionally, the side wall 11 includes side wall portions 11d that are staggered inwardly and extend upwardly to a generally flat top portion element 11e extending transverse to the upwardly extending portion, and generally parallel to the generally flat upper surface 30 of the plate-shaped structure 1 to be connected to the reservoir 10. The flat top portion element 11e preferably adjoins the straight edge portion 11c. Further, the flat top portion element 11e forms a protrusion 57 described above cooperating with a corresponding opening 56 such that it functions as a tongue that is clamped between the upper and lower edge or lip of the opening 56.

Figure 19:
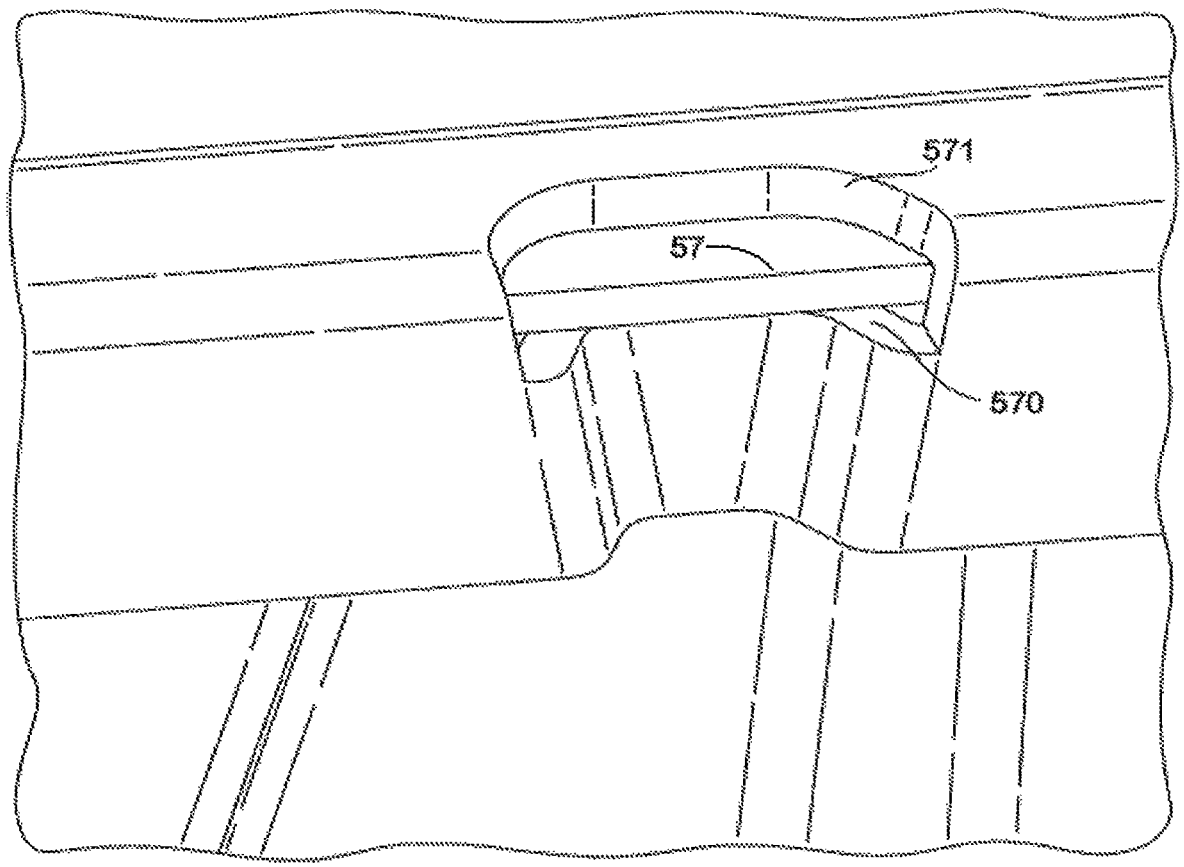
FIG. 19 shows a detailed schematic perspective view of the assembled plate-shaped structure and reservoir of FIG. 16.
Figure 20:
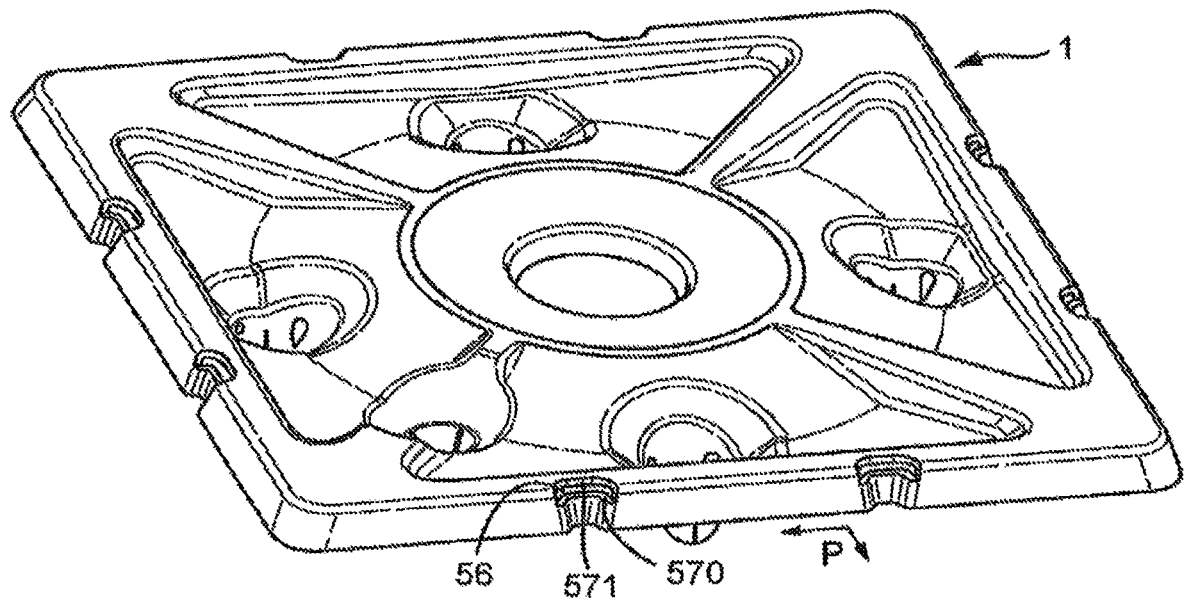
FIG. 20 shows a schematic perspective view of the plate-shaped structure of FIG. 14.

FIG. 19 shows a detailed schematic perspective view of the assembled plate-shaped structure 1 and reservoir 10 of FIG. 16. Again, the protrusion 57 functions as a tongue that is clamped between the lower and upper edge 571 or lip of the opening 56.

FIG. 10J shows a schematic perspective view of the plate-shaped structure 1 of FIG. 10D. As shown, the folded back detent 570 forming the lower edge or lip does not extend beyond or below the upper edge 571 or lip of the opening 56, leaving a volume between the lower edge and the upper edge 571, the volume having a distance E in the plane P wherein the plate-shaped structure 1 extends. Optionally, the reservoir 10 is provided with needle formed openings for irrigating moisture.

Preferably, the inverted U-shaped profile on the exterior sidewall 11 has a geometry that is similar to the cap structure 84 of the plate-shaped structure 1. e.g. as shown in FIG. 9. In the shown embodiment, the upwardly extending sidewall 11 of the reservoir 10 includes an outwardly extending, generally flat top surface 55e and an edge portion 55d downwardly extending from the generally flat top surface 55e. The generally flat top surface 55e has a mainly constant width, but also has wider edge portions 55f at a central position along a side edge of the reservoir 10, thereby providing improved rigidity to the plate-shaped structure. Then, the reservoir can be stored and transported with the flat bottom 14 oriented mainly vertically. i.e. with the downwardly oriented flange 55 on a supporting storing and/or transporting structure. The outwardly extending protrusions 57a-c. 58a-c are provided on the edge portion 55f extending downwardly. During a process of assembling the reservoir 10 to a corresponding plate-shaped structure 1, the inverted U-shaped profile on the exterior sidewall 11 of the reservoir 10 is received in the cap structure 84 of the plate-shaped structure, thereby obtaining a relatively stiff connection between the plate-shaped structure 1 and the reservoir 10, in order to survive damaging natural forces such as wind, rain and weight of soil. The exterior dimensions of the inverted U-shaped profile of the reservoir 10 are slightly smaller than the interior dimensions of the cap structure 84 of the plate-shaped structure 1 to facilitate an easy and reliable fit when assembling the plate-shaped structure to the reservoir. Further, during the process of assembling, the outwardly extending protrusions 57a-c. 58a-c are placed and oriented to traverse the corresponding openings 56a-c of the plate-shaped structure.

Figure 21:
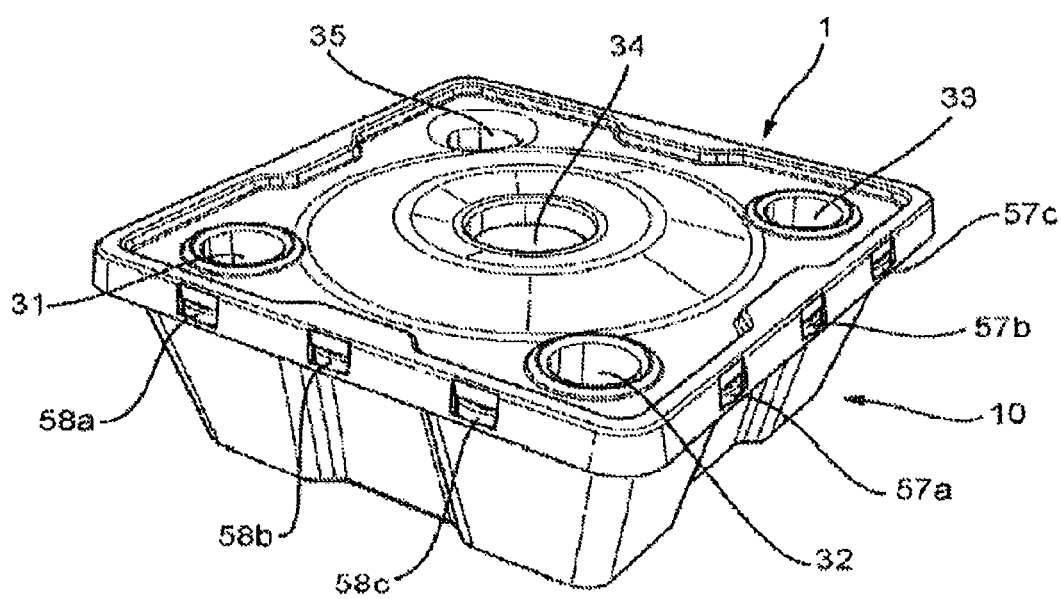
FIG. 21 shows a perspective schematic view of the plate-shaped structure of FIG. 4 and the reservoir of FIG. 10 in an assembled state.

FIG. 21 shows a perspective schematic view of the plate-shaped structure 1 of FIG. 4 and the reservoir 10 of FIG. 10 in an assembled state, forming an autonomous unit.

The connection of the plate-shaped structure to the reservoir can be implemented using reversed U-profiles formed by edge portion 55d, generally flat top surface 55e, and edge portion 55f extending downwardly as described above referring to FIG. 10. The upper side of the exterior sidewalls of the reservoir box has reversed U-profiles. The downside of the sides of the plate-shaped structure also has reversed U-profiles, but they are a little bigger, just so much that the reversed U-profiles of the sidewalls of the box fit in it. In the outer side of the reversed U-profile of the plate-shaped structure, there are openings and detents. In the outside of the reversed U-profile of the sidewall are ribs, also called protrusions, that fit through the openings and fix the detents. This way the collection cover is fixed well to the reservoir, also called box, and resistant against blowing off by strong winds, preventing sand and soil entering the reservoir with the wind, preventing water from the reservoir getting evaporated, and the reversed U-profiles in combination with the ribs on the side of the box prevent the sides of the reservoir and the sides of the interior side wall to collapse through the forces of water, soil and humidity. The reservoir can be square, rounded or rectangle in shape.

Figure 22:
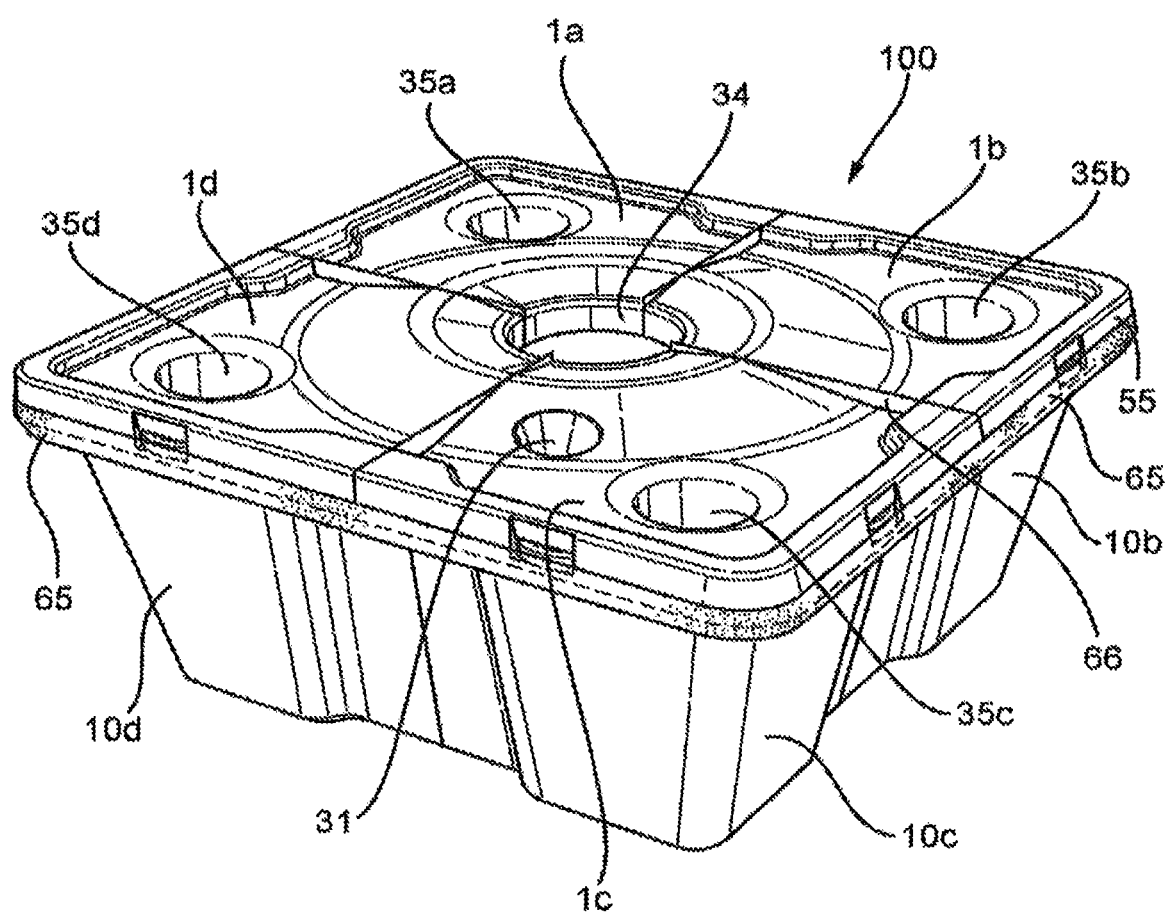
FIG. 22 shows a perspective schematic view of further plate-shaped structure and a further reservoir in an assembled state.

FIG. 22 shows a perspective schematic view of an assembled structure. The assembled structure 100 includes pre-constructed parts together forming an assembled structure having a square, rectangular, diamond, oval or rounded form, when seen from above. The assembled structure 100) is a combination of a multiple number of autonomous units shown in FIG. 21 In the embodiment shown in FIG. 12, the assembled structure includes four autonomous units each having a plate-shaped structure 1a-d and a reservoir 10b-d. The individual autonomous units can be designed such that the assembled structure 100 includes a predefined number of such autonomous units, preferably using symmetry in the design of the assembled structure 100. Generally, by designing square or rectangular shaped individual autonomous units, four autonomous units can be used to form a single assembled structure 100. The assembled structure 100 preferably has a single central hole 34 bounded by an exterior sidewall section of each individual autonomous unit. In principle, each individual autonomous unit is formed by assembling a pre-constructed plate-shaped structure 1 a-d to a corresponding reservoir 10b-d, as described above. Then, the individual autonomous units are combined in a single assembled structure 100 as e.g. shown in FIG. 22. The plate-shaped structures of the individual autonomous units include preferably at least one drain opening 35a-d for filling the individual reservoir, and optionally a single or a multiple number of cavities 31. At least two individual autonomous units can be mainly identical. In the shown embodiment, the four individual autonomous units form each a quadrant of the plate-shaped structure. In a first variant, the individual autonomous units have a mainly equal size and structure, each plate-shaped structure having a drain opening 35 and a pre-selected number of cavities 31. In a second variant, the individual autonomous units can be implemented differently. e.g. as two unit types, viz, a first unit type having a drain opening 35 and a single cavity and a second unit type having a drain opening 35 and two cavities. The individual autonomous units are assembled and put together preferably using a rope, strap, tie or elastic band 65 enclosing the downwardly oriented flanges 55 at the periphery of the plate-shaped structures 1a-d. Depending on the geometry and dimensions of the plate-shaped structures and corresponding reservoirs, also another number of individual autonomous units can be pre-constructed and assembled later. e.g. two autonomous units, three autonomous units, eight autonomous units or ten autonomous units. Then, relatively small molding machines may be used for the construction of relatively large assembled structures 100 including a single central hole 34, thereby meeting specific local markets.

In order to get an optimum stacking of the product the innerside and outside side walls, the cavities, also called cones, the drain opening, also called inverted siphon, and the U-profiles may have a specified angle. The integrated inverted siphon leads to less evaporation of the water inside the reservoir. With a surface of approximately 90 cm$^2$ comparing to the approximately 1.500 cm$^2$ of the 38×38 cm reservoir 10, comparing to the approximately 1.750) cm$^2$ of the 38×46 cm reservoir 10) and comparing to the approximately 2.400 cm² of the 38 and/or 57 cm diameter rounded model reservoir 10, the inverted siphon may reduce the evaporation surface to respective approximately 6%. 5% and 7 and/or 2.75%. In the inverted siphon is a shell with a diameter that is approximately 6 to 10 mm less than the diameter of the inverted siphon. The model of the shell is like a plate with a cone in it, and with wings that go approximately 1 to 2 cm lower than the plate and then go horizontal again. In the middle of the cap a little space may be realized in a cone that is filled with air This gives the possibility to sow a seed in it or put a cutting through it. The sides of the inverted siphon hold the cap in a fixed way and being approximately 4 cm deeper in the inverted siphon, the wind cannot blow it away. The cap may have small spare openings that leave the moisture in when the plate-shaped structure captures it.

If instead a floating cap is used, the wings will be in the water when the cap floats. This prevents the cap from being blown away. The spare openings may help the water level to rise so that the cap can float again. The up and down moving cap closes the inverted siphon for almost 100% when the reservoir is full, and closes it for almost 100% when the reservoir's water level is lower, meaning, that we have a moving cap that goes up and down in a certain range from the top. This way a floating cap is provided, preventing the water from evaporating, while in the same time providing a possibility for moisture or water to enter when there is, and being fixed through intelligent wings floating in the water.

According to an aspect, the sidewall and/or the bottom of the reservoir can function as a slow release carrier for water. The permeability of the paper can be influenced through the concentration of substances that influence the permeability of paper. Generally, a higher concentration of the substances gives a lower permeability, and a lower concentration a higher permeability. The water permeability of the reservoir can also be set by selectively coating the sidewalls and the bottom with a coating layer. By selectively applying the coating layer the water permeability can locally be set. In an exemplary embodiment, a mask is used for spraying a coating material on the sidewalls and/or the bottom. Then, a part of the sidewalls and/or the bottom is coated while another part of the sidewalls and/or the bottom is not coated. In principle, the area of coated sidewall and/or bottom is highly water impermeable, while the area of uncoated sidewall and/or bottom is a direct measure for dosing the water permeability of the reservoir. As a further option, it is noted that the water permeability of the reservoir can be set by making micro-holes in the bottom and/or sidewall of the reservoir with one or more needles. The diameter of the needle, and the quantity of needles, also defines the watergift through these micro-holes. The micro-holes transport the water in the first weeks. During this period de cellulose absorbs some humidity and expands. After this period, the micro-holes may be closing. However, then the cellulose has absorbed the water and starts to add it to the soil below, through capillarity of the cellulose itself. It is noted that the above-mentioned options can be used in combination, e.g. the use of micro-holes in the bottom made with needles and the application of a location dependent coating layer. It is further noted that the irrigating capacity of the reservoir can also be set by a water release function through the use of one or more capillary cords. However, the adjustment of permeability and creating of micro-holes leads to the possibility of creating a reservoir that releases water without the use of a capillary cord, and with a speed of release that can be determined depending to the needs of the soil. In order for the user to be able to understand which permeability he needs, a reservoir for salted soils that has to release a high doses each day, can be made blue, a reservoir for sandy soils that has to release a lower doses can be made yellow, and a reservoir for clay soils that has to release the less water, can be made green.

The cellulose may degrade while using. For this reason it can function as a carrier for nutrients for the plants, as a carrier for substances that combat funguses, diseases and/or damaging animals. These substances can be mixed through the cellulose during the production process. As the circumstances are very dry, commonly used fertilizers and their applying method, cannot be used because of causing too high salt concentrations around the root system, leading to burning of the roots. The slow degradation of the cellulose, in combination with macro-elements N-P-K-Mg and micro-elements may lead to protection of the roots, to non-burning of the roots and a good and sufficient mineral availability absorbing situation even under dry circumstances.

For plants mycorrhizae form the carrier of minerals in the soil, to exchange them with. In order to have a higher mycorrhizae population it is interesting to inoculate the soil with desired species. During a process of producing the reservoir and/or the plate-shaped structure, the product may be heated after a moulding process, in order to dry it. For this reason it might be undesired or impossible to mix mycorrhizae through the cellulose during the production process. The drying process may sterilize the humid cellulose. For this reason the mycorrhizae may be added to the reservoir after the production process. This can be done by putting glue to the outside of the bottom and/or side of the reservoir and attach the mycorrhizae to this glue. Other glues from a chemical background may influence the life time of mycorrhizae. Some kill the mycorrhizae, other have an influence on the germination of seeds and the root development. Glue can be neutral to root development and seed germination.

Figure 23:
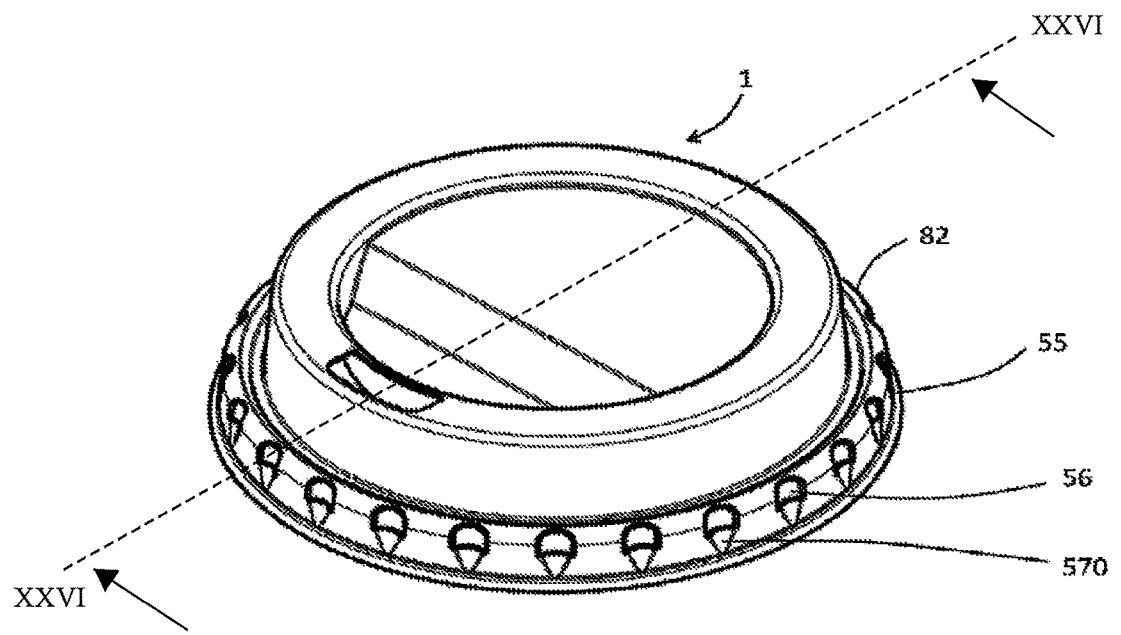
FIG. 23 shows a perspective schematic view of the plate-shaped structure with details of the flange and generally flat upper surface containing openings and detents for receiving protrusions.

FIG. 23 shows a perspective schematic view of an embodiment of the plate-shaped structure 1 with details of the flange 55 containing openings 56 and detents 570 for receiving protrusions. The plate-shaped structure 1 includes an inverted U-profile with a flat top portion 82 and a downwardly oriented flange 55 at the periphery of the generally flat top portion 82 wherein the downwardly oriented flange 55 comprises openings 56 for receiving protrusions. It is noted that protrusions can be, here and in general, a single protrusion generally extending along the perimeter of the reservoir or a number of individual protrusions.

The embodiment in FIG. 23 comprises openings 56 provided in an edge area where the generally flat top portion 82 of the U-profile adjoins the flange 55 showing the openings are located partly on the generally flat top portion 82 and partly on the flange 55. The openings are defined by a lower edge, two opposing side edges and an upper edge wherein the lower edge of the opening 56 may be the upper edge of an indent in the flange of the plate-shaped structure 1. The opposing side edges of the opening 56 may be positioned in the flange 55 and the upper edge of the opening 56 may be positioned in the generally flat top portion 82. The upper edge of the opening 56 in the generally flat top portion 82 may be rounded, which is better in view of deformation stress distribution to prevent tearing.

Generally flat means in particular that at least the points at the perimeter of the surface that are in contact with the reservoir, in particular the top portion 82 of the inverted U-profile, are in one plane such as to fit closely to the upper edge of the reservoir. The term generally flat upper surface of the plate shape structure does not exclude presence of different shapes in the generally flat surface, as described above, for example drains, cavities, ridges, corrugations etc. In this particular embodiment of FIG. 13, the generally flat upper surface 30 of the plate shape structure comprises an outstanding protrusion comprising an opening for drinking and an indent so as to comfortably allow the lips of the drinker to enclose the drinking opening. This area may be rounded, may contain indented images or text, may be completely flat, may be hollow, may contain sharp edges or rounded edge, may be asymmetrical or any combinations of the above.

Figure 24:
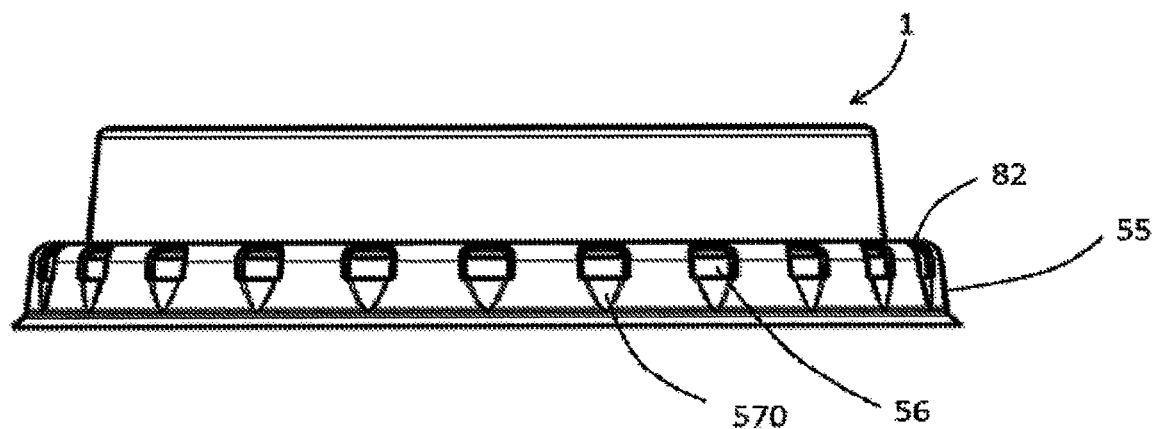
FIG. 24 shows a schematic side-view of the plate-shaped structure of FIG. 23 with details of the flange and generally flat upper surface containing openings and detents for receiving protrusions.

FIG. 24 shows a schematic side-view of the plate-shaped structure of FIG. 23 wherein openings are provided extending in both the flange and the generally flat top portion 82 of the inverted u-profile for receiving protrusions and the flange comprises detents 570. This embodiment shows openings 56 and detents 570 positioned so that a protrusion, for example a rolled-lip protrusion, can be received on the edge of the indent and provide a watertight clamp with the plate-shaped structure.

Figure 25:
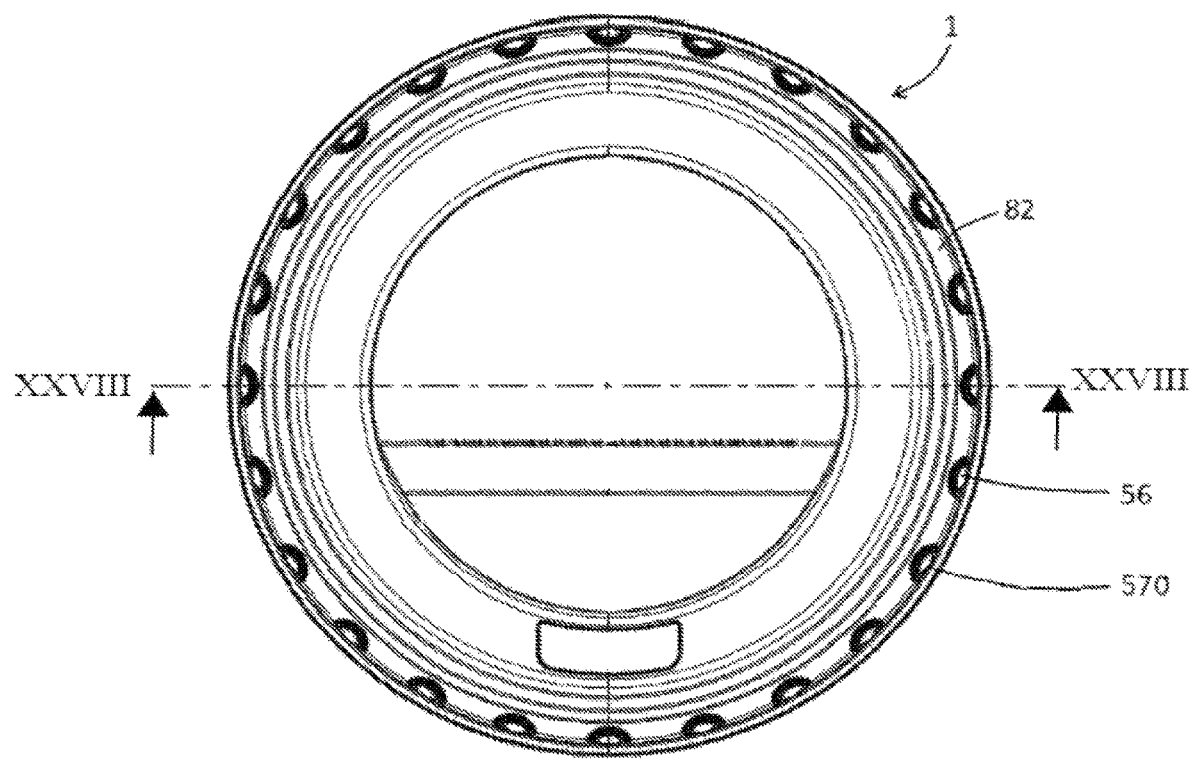
FIG. 25 shows a schematic top-view of the plate-shaped structure of FIG. 23 with details of the generally flat upper surface containing openings and detents.

FIG. 25 shows a schematic top-view of the plate-shaped structure 1 of FIG. 23 with details of the generally flat top portion 82 containing openings 56 and detents 570. This view clearly shows the openings extend partly in the generally flat top portion of the inverted U profile. It is preferred that openings extend only over part of the substantially horizontal part of the inverted U-profile to provide a water tight connection with the reservoir. Clearly the opening should not extend inwardly beyond the inner wall of the reservoir.

In the particular embodiment of FIG. 25, the plate-shaped structure 1 comprises an opening for drinking and a geometry to allow for easier access to said opening.

Figure 26:
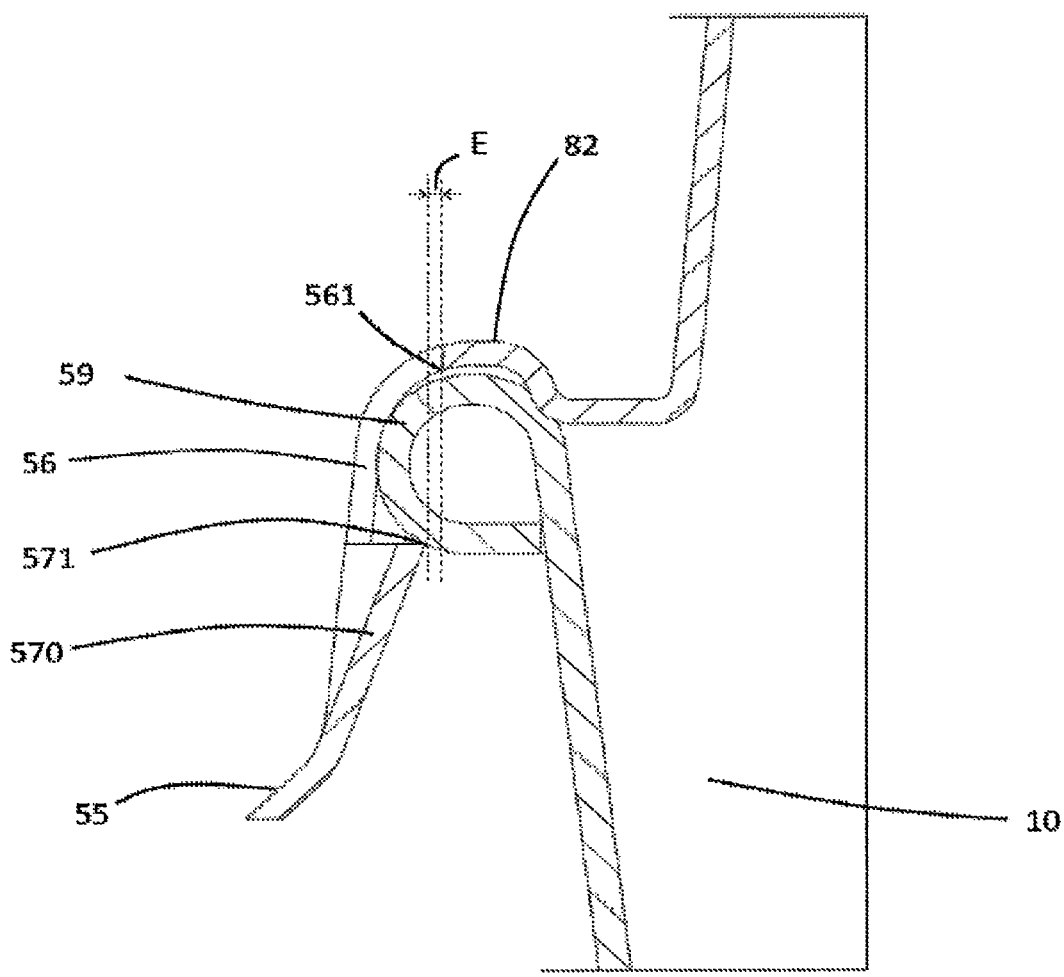
FIG. 26 shows a schematic cross-sectional view XXVI-XXVI of the plate-shaped structure of FIG. 23 engaging a reservoir with a rolled-lip protrusion, detailing a clamping connection between the cover openings and detents and the protrusion of the reservoir.

FIG. 26 shows a cross-sectional view along the line indicated in FIG. 15, of the plate-shaped structure 1 of FIG. 23 engaging a reservoir 10 with a rolled-lip protrusion 59, detailing the flange 55 containing an opening 56 and a detent 570 for receiving said protrusion 59, wherein a distance E between the edge 561 of the generally flat top portion 82 of the inverted U profile and the edge of the indent in a horizontal plane is defined. It is noted that the distance E allows easy removal of the plate shaped structure from the mould without deformation of the moulded article, which is particularly advantageous in case of paper pulp processing because fresh moulded paper pulp products are difficult to deform without tearing when removing them from the mould. Further, in view of easy removal from the mould in paper pulp processing the flange preferably has a flange angle of at least about 5, 7 or 10 degrees to a reference line perpendicular to the periphery of the generally flat surface. The invention allows to make a drinking cups and food reservoirs with covers that are fully biodegradable, preferably the cover being made from paper pulp and the reservoir being made from paper, preferably also from paper pulp.

The present disclosure allows the plate-shaped structure 1 to be manufactured using a pulp molding process, wherein the result of said process is a complete lid for covering a reservoir wherein the process by which the plate-shaped structure 1 is produced may be a paper pulp molding thermo-forming process. The process of manufacturing the plate-shaped structure 1 may comprise two molds, a first mold and a contra-mold, wherein the geometry of the plate-shaped structure 1 allows the contramold to retrieve the plate-shaped structure 1 from the first mold without deformation of the plate-shaped structure 1. The combination and geometry of the first mold and the contra-mold may limit the deposition of pulp for forming openings in the surface of the plate-shaped structure 1. The limitation of deposition of pulp on certain places of the geometry allows openings to be formed in the surface area of the plate-shaped structure 1. The placing of these openings allows the development of a plate-shaped structure 1 that holds a protrusion of a reservoir in place while simultaneously being easily extractable from the first mold.

Figure 27:
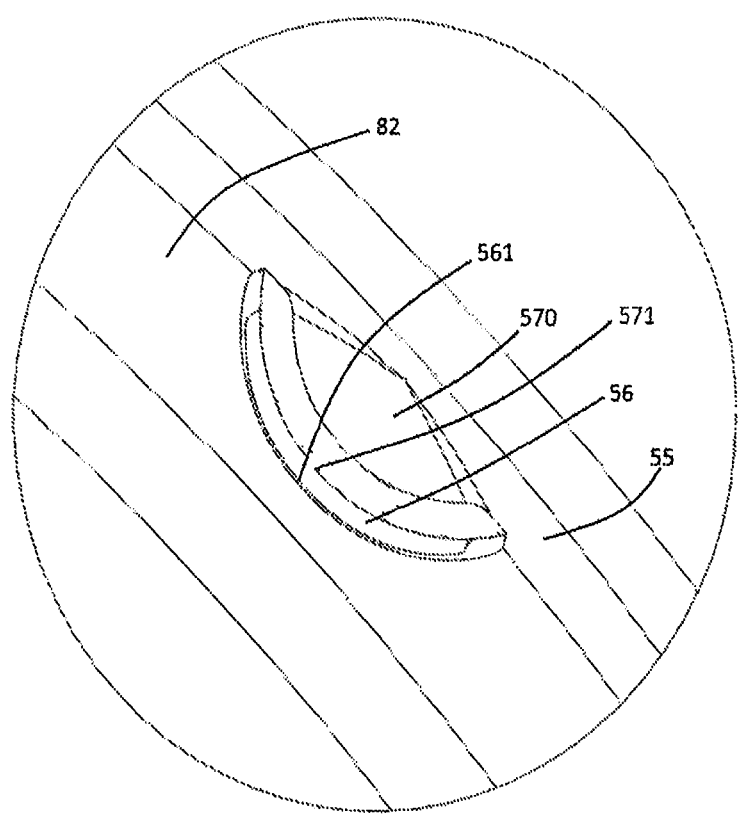
FIG. 27 shows a schematic top-view close-up of the plate-shaped structure of FIG. 25 with details of the flange, the generally flat upper surface, the opening and the detent.

FIG. 27 shows a schematic top-view close-up of the plate-shaped structure 1 of FIG. 25 with details of the flange 55, the generally flat top part of the inverted U profile, the opening 56 and the detent 570, wherein a distance E between the edge 561 of the generally flat upper surface and the edge of the indent 570 in a horizontal plane is defined. FIG. 27 shows the shaded area as the thickness of the plate-shaped structure 1 on the location where the opening 56 is applied in the surface of the plate-shaped structure 1.

Figure 28:
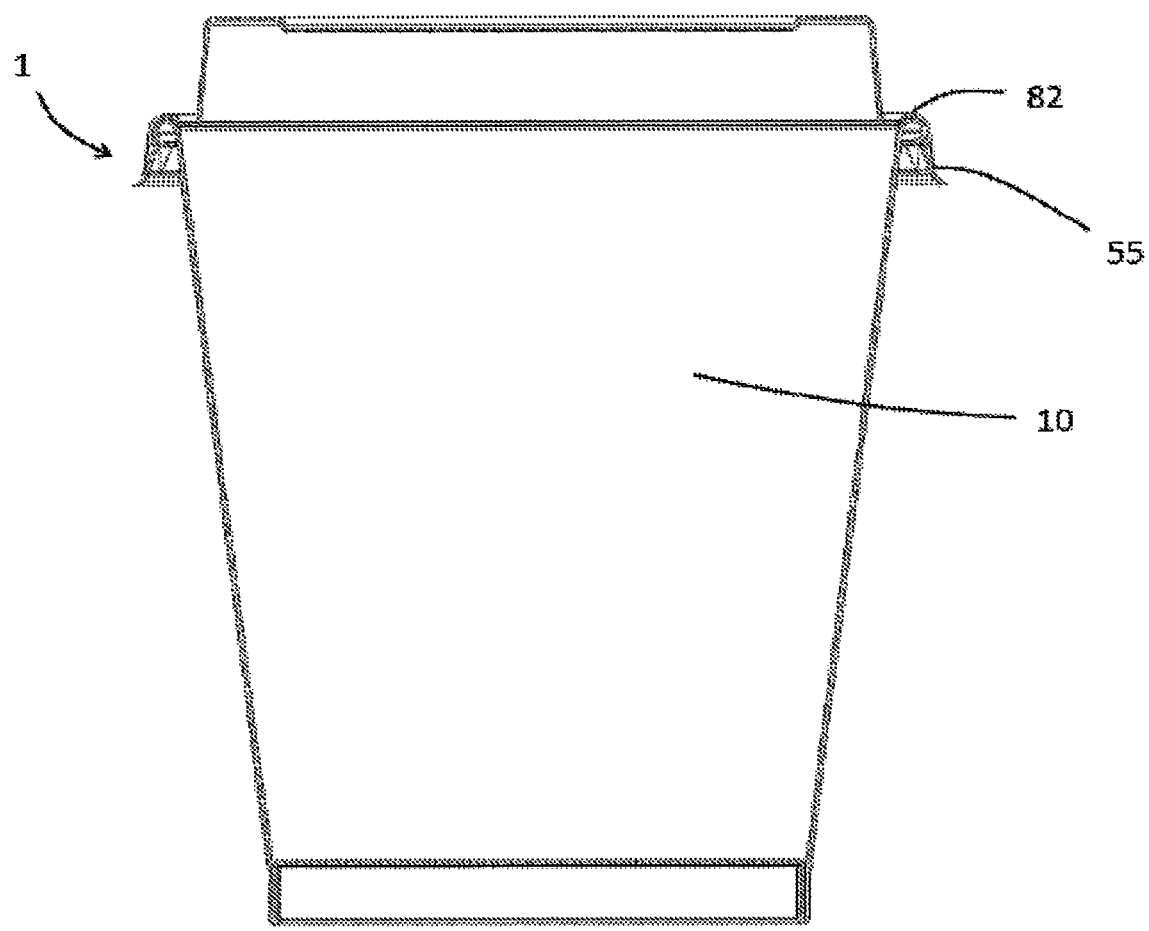
FIG. 28 shows a schematic cross-sectional view along line XXVIII-XVIII of an assembly of the plate-shaped structure of FIG. 25 assembled with a cup reservoir, with details of the flange and the generally flat upper surface.

FIG. 28 shows a schematic cross-sectional side view of an assembly of the plate-shaped structure 1 of FIG. 23 and a reservoir 10. In this particular embodiment, the reservoir 10 may be a cup, for example a drinking cup, releasably engaged with the plate-shaped structure 1 which is applied as a cover for said reservoir 10.

The invention is not restricted to the embodiments described herein. It will be understood that many variants are possible.

It is noted that the top edge of the reservoir exterior side wall may mainly form a square contour. However, also other contours are possible, such as a rectangular contour or a polygon contour.

Further, instead of a single stay, a multiple number of stays can be used to define a predefined offset between opposite sections of the interior side wall top edge of the reservoir. It is also noted that the central opening of the plate-shaped structure may support a sheath foil surrounding the plant. An exemplary sheath foil is described in the Dutch patent application 2012651 in the name of the applicant.

It is noted that the design of the drain opening and the cap can be applied in combination with the plate-shaped structure as defined in claim 1, but also more generally in a plate-shaped structure for cultivating a plant, comprising an upper surface without a cavity. As an example, a plate-shaped structure for cultivating one or more plants can be provided with the above-mentioned drain opening and a cap, but without a cavity.

It is further noted that the design of the protrusions and the corresponding openings for assembling a reservoir and a plate-shaped structure for cultivating a plant according to claim 1 can be applied more generally to a reservoir and a plate-shaped structure for cultivating a plant, the structure comprising a generally flat upper surface without a cavity.

It is especially noted that the design of the protrusions and the corresponding openings for assembling can not only be applied to a reservoir and a plate-shaped structure for cultivating a plant, but also for connecting a cover to a cup such as a drinking cup, more especially if the cover and cup are manufactured from a pulp moulding process such as from cellulose and/or paper material. Then, the cup generally includes an upwardly extending exterior sidewall, and the cover covering the cup has a generally flat upper surface including a downwardly oriented flange at the peripheral of the generally flat upper surface, for receiving the upwardly extending exterior sidewall of the cup. The downwardly oriented flange and the upwardly extending exterior sidewall comprise corresponding protrusions and openings for receiving the protrusions.

Similarly, it is noted that the concept of providing a stay on the plate-shaped structure and/or the reservoir defining a predefined offset between opposite sections of the central opening can be applied to the plate-shaped structure as defined in claim 1, but also more generally in a plate-shaped structure for cultivating a plant, comprising an upper surface without a cavity.

It also noted that the described concepts, such as the drain opening and the cap, the protrusions, the detents and the corresponding openings for assembling, the stay, the concept of assembling the plate-shaped structure and/or the reservoir from pre-constructed parts, the concept wherein a sidewall and/or a bottom of the reservoir functions as a slow release carrier for water, and the design of the cavity on the plate-shaped structure may be applied to plate-shaped structures or a reservoir respectively for cultivating a plant, but also to structures having another upper surface for cultivating a plant. e.g. a curved surface or a funnel-shaped surface, as described e.g. in patent publication WO 2009/078721.

As a further example of a variant, it is noted that the reservoir and/or the plate-shaped structure can be provided with stiffening elements such as horizontal, vertical and/or diagonal rim members to increase stiffness of the reservoir.

It is also noted that the assembled reservoir and plate-shaped structure can be put on the ground or can be buried in the ground, either partially or completely. Further, the assembled reservoir and plate-shaped structure can be applied in flat or sloped areas such as hills or mountains.

Other such variants will be apparent for the person skilled in the art and are considered to fall within the scope of the invention as defined in the following claims. For the purpose of clarity and a concise description features are described herein as part of the same or separate embodiments. However, it will be appreciated that the scope of the invention may include embodiments having combinations of all or some of the features described.

The following numbered paragraphs set out particular combinations of features which are considered relevant to particular embodiments of the present disclosure.

1. A plate-shaped structure designed for covering a reservoir, said plate-shaped structure comprises a substantially flat surface and a flange at the periphery of the substantially flat upper surface, wherein the flange comprises plurality of openings designed to receive a protrusion on an exterior sidewall of the reservoir, thereby covering the reservoir.

2. The plate-shaped structure of paragraph 1, wherein the flange contains a plurality of detents designed to releasably hold the protrusion on the exterior sidewall of the reservoir.

3. The plate-shaped structure of paragraph 1, wherein the openings are provided in an edge area where the generally flat upper surface adjoins the flange of the plate-shaped structure.

4. The plate-shaped structure of paragraph 1, wherein the flange of the plate-shaped structure includes an inwardly staggered supporting element forming a detent designed for detaining a protrusion of the reservoir in the opening.

5. The plate-shaped structure of paragraph 2 or 4, wherein the detent does not extend beyond the upper edge of the openings.

6. The plate-shaped structure of paragraph 5, wherein the detent leaves a volume between the detent and the upper edge of the opening, the volume having a width in the plane wherein the plate-shaped structure extends.

7. The plate-shaped structure of paragraph 1, wherein the flange is part of an inverted U-profile designed for receiving the upwardly extending exterior sidewall of the reservoir.

8. The plate-shaped structure of paragraph 7, wherein said openings comprise a lower edge and an upper edge and wherein detents form an edge of the lower side of the openings on the flange and the upper edge is on the generally flat top portion of the inverted U-profile of the plate-shaped structure.

9 The plate-shaped structure of paragraph 1, wherein the plate-shaped structure is manufactured from cellulose and/or paper material and/or plastic.

10. The plate-shaped structure of paragraph 1, wherein the plate-shaped structure is manufactured from biodegradable material selected from cellulose, paper material, biodegradable plastic or combinations thereof.

11. The plate-shaped structure of paragraph 1, wherein the plate-shaped structure is designed as a cover for a cup.

12. The plate-shaped structure of paragraph 1, wherein the plate-shaped structure is designed as a cover for a drinking cup.

13. The plate-shaped structure of paragraph 1, having a generally circular shape.

14. The plate-shaped structure of paragraph 1, having a substantially square or substantially rectangular shape.

15. The plate-shaped structure of paragraph 1, wherein the plate-shaped structure is designed as a cover for a reservoir wherein said reservoir is a food container.

16. The plate-shaped structure of paragraph 1, having at least 4 openings and detents.

17. The plate-shaped structure of paragraph 7, having openings extending partly in the substantially horizontal part of the inverted U-profile and partly in the flange and detents in the flange under the openings.

18. The plate-shaped structure of paragraph 17, wherein the openings extend only over part of the substantially horizontal part of the inverted U-profile to provide a water tight connection with the reservoir.

19. The plate-shaped structure of paragraph 1, wherein the flange has a flange angle of at least about 5, 7 or 10 degrees to a reference line perpendicular to the periphery of the generally flat surface.

20. An assembly comprising a reservoir comprising an upwardly extending exterior sidewall comprising one or more outwardly extending protrusion and a plate-shaped structure having a generally flat upper surface including a downwardly oriented flange at the periphery of the generally flat upper surface designed for receiving the upwardly extending exterior sidewall of the reservoir wherein the downwardly oriented flange comprises openings designed for receiving one or more protrusions on the upwardly extending exterior sidewall of the reservoir.

21. The assembly of paragraph 20, wherein the flange contains a plurality of detents designed to releasably hold the protrusion on the exterior sidewall of the reservoir.

22. The assembly of paragraph 20, wherein the openings are provided in an edge area where the generally flat upper surface adjoins the flange of the plate-shaped structure.

23. The assembly of paragraph 20, wherein the flange of the plate-shaped structure includes an inwardly staggered supporting element forming a detent designed for detaining a protrusion of the reservoir in the opening.

24. The assembly of paragraph 21 or 22, wherein the detent does not extend beyond the upper edge of the openings.

25. The assembly of paragraph 24, wherein the detent leaves a volume between the detent and the upper edge of the opening, the volume having a width in the plane wherein the plate-shaped structure extends.

26. The assembly of paragraph 20, wherein the flange is part of an inverted U-profile designed for receiving the upwardly extending exterior sidewall of the reservoir.

27. The assembly of paragraph 26, wherein said openings comprise a lower edge and an upper edge and wherein detents form an edge of the lower side of the openings on the flange and the upper edge is on the generally flat top portion of the inverted U-profile of the plate-shaped structure.

28. The assembly of paragraph 20, wherein the plate-shaped structure is manufactured from cellulose and/or paper material and/or plastic.

29. The assembly of paragraph 20, wherein the plate-shaped structure is manufactured from biodegradable material selected from cellulose, paper material, biodegradable plastic or combinations thereof.

30. The assembly of paragraph 20, wherein the plate-shaped structure is designed as a cover for a cup.

31. The assembly of paragraph 20, wherein the plate-shaped structure is designed as a cover for a drinking cup.

32. The assembly of paragraph 20, having a generally circular shape.

33. The assembly of paragraph 20, having a substantially square or substantially rectangular shape.

34. The assembly of paragraph 20, wherein the plate-shaped structure is designed as a cover for a reservoir wherein said reservoir is a food container.

35. The assembly of paragraph 20, having at least 4 openings and detents.

36 The assembly of paragraph 26, having openings extending partly in the substantially horizontal part of the inverted U-profile and partly in the flange and detents in the flange under the openings.

37 The assembly of paragraph 17, wherein the openings extend only over part of the substantially horizontal part of the inverted U-profile to provide a water tight connection with the reservoir.

38. The assembly of paragraph 20, wherein the flange has a flange angle of at least about 5, 7 or 10 degrees to a reference line perpendicular to the periphery of the generally flat surface.

39. The assembly according to paragraph 20, wherein the reservoir is a drinking cup.

40. The assembly according to paragraph 20, wherein the protrusion on the reservoir is a tongue or a rolled-lip protrusion.

41. The assembly according to paragraph 20, wherein the protrusion on the reservoir is a rolled-lip protrusion along the circumference at the upper edge of the upward extending exterior side wall of the reservoir or a tongue.

42. The assembly according to paragraph 20, wherein the reservoir and the cover are manufactured from biodegradable material selected from cellulose, paper material, biodegradable plastic or combinations thereof.

43. The assembly according to paragraph 24, wherein the cover is manufactured from paper pulp.

44. The assembly according to paragraph 24, wherein both the cover and the cup are manufactured from paper pulp.

45. A process for the manufacture of the plate-shaped structure of paragraph 1-19, using a pulp molding process.

46. The process of paragraph 45, wherein the plate-shaped structure is manufactured using a paper pump molding thermo-forming process.

47. The process of paragraph 45, comprising a first mold and a contra-mold, wherein the geometry of the plate-shaped structure allows the contra-mold to retrieve the plate-shaped structure from the first mold without deformation of the plate-shaped structure.

48. The process of paragraph 47, wherein the first mold and the contra-mold in combination limit deposition of pulp for forming openings in the surface of the plate-shaped structure.

The invention claimed is:

1. A plate-shaped structure designed for covering a reservoir, said plate-shaped structure manufactured from biodegradable material selected from cellulose, paper material, or combinations thereof, using a pulp molding process, and comprising:
   a generally flat upper surface having a periphery, wherein the entire periphery of the generally flat upper surface exists in a plane;
   an inverted U-profile forming a flange at the periphery of the generally flat upper surface, comprising a first edge portion extending upwards from the generally flat upper surface of the plate-shaped structure, a generally flat top portion adjacent to the first edge portion, and a second edge portion extending downwards from the generally flat top portion:
   wherein the inverted U-profile comprises a plurality of openings designed to receive a protrusion on an exterior sidewall of the reservoir, the openings extending partly in the generally flat top portion and extending partly in the downwardly extending second edge portion,
   wherein the second edge portion contains a plurality of detents shaped to releasably hold the protrusion on the exterior sidewall of the reservoir, each detent formed by a section of the second edge portion folded inwards in the plane towards first edge portion of the inverted U-profile, wherein each detent does not extend beyond or below an upper edge of that detents respective opening.

2. The plate-shaped structure of claim 1, wherein the second edge portion of the inverted U-profile is configured to bend over an outer edge of the protrusion on the exterior sidewall of the reservoir in sections of the downwardly extending second edge portion where one of the plurality of openings is not present.

3. The plate-shaped structure of claim 1, wherein inverted U-profile is configured to lock the protrusion on the exterior sidewall of the reservoir in a horizontal direction between the upwardly extending first edge portion and the downwardly extending second edge portion of the inverted U-profile.

4. The plate-shaped structure of claim 1, wherein the plate-shaped structure is designed as a cover for a drinking cup or food container.

5. The plate-shaped structure of claim 1, wherein the plurality of openings extend only over part of the generally flat top portion of the inverted U-profile to provide a water tight connection with the reservoir.

6. The plate-shaped structure of claim 1, wherein the flange has a flange angle of at least about 5, 7 or 10 degrees to a reference line perpendicular to the periphery of the generally flat upper surface.

7. An assembly comprising a reservoir comprising an upwardly extending exterior sidewall comprising outwardly extending protrusions and the plate-shaped structure according to claim 1 for covering the reservoir.

8. A plate-shaped structure designed for covering a reservoir, said plate-shaped structure manufactured from biodegradable material selected from cellulose, paper material, or combinations thereof, using a pulp molding process, and comprising:
- a generally flat upper surface having a periphery, wherein the entire periphery of the generally flat upper surface exists in a plane;
- a flange formed at the periphery of the generally flat upper surface, the flange comprising a plurality of openings designed to receive a protrusion on an exterior sidewall of the reservoir, the openings extending partly in a generally flat top portion of the flange and extending partly in a downwardly extending portion of the flange,
- wherein the downwardly extending portion of the flange contains a plurality of detents shaped to releasably hold the protrusion on the exterior sidewall of the reservoir,
- wherein the detents are formed by inwardly folded sections of the downwardly extending portion of the flange, wherein the inwardly folded sections extend in the plane, wherein each detent does not extend beyond or below an upper edge of that detents respective opening
- wherein the flange has a flange angle of at least about 5 degrees to a reference line perpendicular to the periphery of the generally flat upper surface.

9. The plate-shaped structure of claim 8, wherein the openings extend inwards in the generally flat top portion of the flange at least as far as the inwardly folded sections of the second edge portion forming the detents.

10. The plate-shaped structure of claim 8, wherein the downwardly extending portion of the flange is configured to bend over an outer edge of the protrusion on the exterior sidewall of the reservoir in sections of the downwardly extending portion of the flange where one of the plurality of openings is not present.

\* \* \* \* \*